US009237464B2

(12) United States Patent
Guo et al.

(10) Patent No.: US 9,237,464 B2
(45) Date of Patent: *Jan. 12, 2016

(54) TRANSMISSION METHOD, APPARATUS, AND SYSTEM FOR UPLINK TRANSMIT DIVERSITY

(71) Applicant: Huawei Technologies Co., Ltd., Shenzhen, Guangdong (CN)

(72) Inventors: Xuanyu Guo, Shenzhen (CN); Yanyan Chen, Beijing (CN); Yongqiang Gao, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

This patent is subject to a terminal disclaimer.

(21) Appl. No.: 14/115,862

(22) PCT Filed: Jan. 21, 2013

(86) PCT No.: PCT/CN2013/070780
§ 371 (c)(1),
(2) Date: Nov. 5, 2013

(87) PCT Pub. No.: WO2013/107421
PCT Pub. Date: Jul. 25, 2013

(65) Prior Publication Data
US 2014/0080422 A1    Mar. 20, 2014

(30) Foreign Application Priority Data

Jan. 21, 2012  (CN) .......................... 2012 1 0019432

(51) Int. Cl.
*H04M 1/00* (2006.01)
*H04W 24/02* (2009.01)
(Continued)

(52) U.S. Cl.
CPC ............. *H04W 24/02* (2013.01); *H04B 7/0404* (2013.01); *H04B 7/06* (2013.01); *H04B 7/0689* (2013.01)

(58) Field of Classification Search
CPC ...... H04B 7/06; H04B 7/0408; H04W 52/367
USPC ......... 455/515, 517, 522, 524, 560, 561, 101, 455/103, 127.1
See application file for complete search history.

(56) References Cited

U.S. PATENT DOCUMENTS

2004/0001472 A1    1/2004  Kwak et al.
2006/0126509 A1*   6/2006  Abi-Nassif ............. H04L 47/10
                                                    370/235
(Continued)

FOREIGN PATENT DOCUMENTS

CN    1462124 A    12/2003
CN    1909407 A     2/2007
(Continued)

OTHER PUBLICATIONS

Office Action in corresponding U.S. Appl. No. 14/066,424 (Apr. 7, 2015).
(Continued)

*Primary Examiner* — Tuan Pham
(74) *Attorney, Agent, or Firm* — Leydig, Voit & Mayer, Ltd.

(57) ABSTRACT

Embodiments of the present invention disclose a transmission method, apparatus, and system for uplink transmit diversity, which relate to the field of communications. To determine activation or deactivation of uplink transmit diversity in time and effectively to improve uplink transmission quality, the technical solution provided in the present invention is as follows: determining, by a base station, to activate/deactivate uplink transmit diversity of a user equipment and sending an activation/deactivate request indication to a radio network controller, the activation/deactivate request indication is used for the radio network controller to instruct the user equipment to activate/deactivate the uplink transmit diversity. The present invention is applicable to the control of uplink transmit diversity transmission.

20 Claims, 12 Drawing Sheets

(51) Int. Cl.
*H04B 7/06* (2006.01)
*H04B 7/04* (2006.01)

(56) References Cited

U.S. PATENT DOCUMENTS

| | | | |
|---|---|---|---|
| 2008/0123548 A1 | 5/2008 | Ranta-aho et al. | |
| 2008/0175329 A1 | 7/2008 | Kuo | |
| 2010/0056184 A1* | 3/2010 | Vakil | H04W 4/02 455/456.5 |
| 2010/0172425 A1 | 7/2010 | Pare et al. | |
| 2010/0234060 A1 | 9/2010 | Beamish | |
| 2011/0026631 A1 | 2/2011 | Zhang et al. | |
| 2011/0085614 A1 | 4/2011 | De Pasquale et al. | |
| 2012/0113797 A1* | 5/2012 | De Pasquale et al. | H04B 7/0628 370/216 |
| 2012/0135762 A1 | 5/2012 | Cheng et al. | |
| 2014/0056376 A1* | 2/2014 | Guo et al. | 375/267 |
| 2014/0080422 A1 | 3/2014 | Guo et al. | |

FOREIGN PATENT DOCUMENTS

| | | |
|---|---|---|
| CN | 101132256 A | 2/2008 |
| CN | 101166143 A | 4/2008 |
| CN | 101212807 A | 7/2008 |
| CN | 101350694 A | 1/2009 |
| CN | 101959271 A | 1/2011 |
| CN | 101998673 A | 3/2011 |
| CN | 102035584 A | 4/2011 |
| CN | 102761357 A | 10/2012 |
| KR | 2006-0108854 A | 10/2006 |
| WO | 2011043727 A2 | 4/2011 |
| WO | 2011116727 A2 | 9/2011 |

OTHER PUBLICATIONS

"3$^{rd}$ Generation Partnership Project; Technical Specification Group Radio Access Network; UTRAN Iub interface Node B application Part (NBAP) signaling (Release 9)," 3GPP TS 25.433, V9.6.0, pp. 1-1260, 3$^{rd}$ Generation Partnership Project, Valbonne, France (Mar. 2011).

"Iub/Iur handling of deactivation/reactivation of secondary carrier for DC-HSUPA," 3GPP TSG-RAN3 Meeting #64, San Francisco, California, R3-091170, 3$^{rd}$ Generation Partnership Project, Valbonne, France (May 4-8, 2009).

"Dynamic control of UL CLTD via HS-SCCH orders." 3GPP TSG RAN WG1 Meeting #65, Barcelona, Spain, Change Request, R1-111533, 3$^{rd}$ Generation Partnership Project, Valbonne, France (May 9-13, 2011).

"3GPP TS 25.331—3$^{rd}$ Generation Partnership Project; Technical Specification Group Radio Access Network; Radio Resource Control (RRC); Protocol specification (Release 11)," Version 11.0.0, 3$^{rd}$ Generation Partnership Project, Valbonne, France (Dec. 2011).

"3GPP TS 25.433—3$^{rd}$ Generation Partnership Project; Technical Specification Group Radio Access Network; UTRAN Iub interface Node B Application Part (NBAP) signaling (Release 11)," Version 11.0.0, 3$^{rd}$ Generation Partnership Project, Valbonne, France (Dec. 2011).

"3GPP TR 25.863—3$^{rd}$ Generation Partnership Project; Technical Specification Group Radio Access Network; Universal Terrestrial Radio Access (UTRA); Uplink transmit diversity for High Speed Packet Access (HSPA) (Release 11)," Version 11.0.0, 3$^{rd}$ Generation Partnership Project, Valbonne, France (Dec. 2011).

* cited by examiner

TRANSMISSION METHOD, APPARATUS, AND SYSTEM FOR UPLINK TRANSMIT DIVERSITY

CROSS-REFERENCE TO RELATED APPLICATIONS

This application is a National Stage of International Patent Application No. PCT/CN2013/070780, filed on Jan. 21, 2013, which claims priority to Chinese Patent Application No. 201210019432.8, filed on Jan. 21, 2012, all of which are hereby incorporated by reference in their entireties.

TECHNICAL FIELD

The present invention relates to the field of communications technologies, and in particular, to a transmission method, apparatus, and system for uplink transmit diversity.

BACKGROUND

Uplink transmit diversity technologies can lower transmit power of a terminal, improve edge coverage, and increase cell capacity, and also has an effect of increasing a service transmission rate for a cell-edge user, thereby enhancing user experience. Therefore, by applying uplink transmit diversity technologies such as MIMO (Multiple-Input Multiple-Output, Multiple-Input Multiple-Output) to UMTS (Universal Mobile Telecommunications System, Universal Mobile Telecommunications System) uplink transmission, the requirements for increasing spectrum efficiency, improving uplink transmission coverage, and further increasing a user's peak rate for UMTS uplink transmission can be met.

In the prior art, in a scenario where uplink transmit diversity technologies are applied to UMTS uplink transmission, during service setup, as shown in FIG. 1, an RNC (Radio Network Controller, radio network controller) can determine, according to the uplink transmit diversity capability of a UE (User Equipment, user equipment) carried in an RRC (Radio Resource Control, radio resource control protocol) connection setup request sent by the UE and the uplink transmit diversity capability of a cell in AUDIT sent by a NodeB (base station), that the UE and the NodeB may adopt uplink transmit diversity to transmit data and determine whether to activate uplink transmit diversity of the UE. Furthermore, when the RNC determines to activate the uplink transmit diversity of the UE, the RNC separately instructs the NodeB by using an RL Setup Request (radio link setup request) that the uplink transmit diversity of the UE is activated and instructs the UE by using an RB Setup Request (radio bearer setup request) to activate the uplink transmit diversity of the UE.

However, it is only determined whether to activate the uplink transmit diversity of the UE during service setup. Therefore, after the service setup, the activation/deactivation of the uplink transmit diversity of the UE cannot be dynamically adjusted according to a reference value obtained through measurement such as UE's current power or current channel quality. Hence, the prior art further proposes that after service setup, the RNC dynamically adjusts the activation/deactivation of the uplink transmit diversity of the UE through RB reconfiguration and RL reconfiguration processes. The specific procedures are shown in FIG. 2.

During the implementation of the present invention, the inventor finds that the prior art has at least the following problems: after receiving a reference value obtained through measurement reported by a UE or a NodeB, an RNC determines whether to activate uplink transmit diversity of the UE according to the reported reference value obtained through measurement; however, the real-time quality of the reporting of the UE or the NodeB depends on a measurement report period, where an undesirable delay problem exists, which leads to poor timeliness and effectiveness in determining whether to activate uplink transmit diversity, and affects uplink transmission.

SUMMARY

Embodiments of the present invention provide a transmission method, apparatus, and system for uplink transmit diversity, which can determine activation or deactivation of uplink transmit diversity in time and effectively, thereby improving uplink transmission quality.

In one aspect of the present invention, a transmission method for uplink transmit diversity is provided, which includes: determining, by a base station, to activate uplink transmit diversity of a user equipment, and sending an activation request indication to a radio network controller, so that the radio network controller instructs, according to the activation request indication, the user equipment to activate uplink transmit diversity, or, determining, by a base station, to deactivate uplink transmit diversity of a user equipment, and sending a deactivation request indication to a radio network controller, so that the radio network controller instructs, according to the deactivation request indication, the user equipment to deactivate uplink transmit diversity.

In another aspect of the present invention, a base station is provided, which includes: an activation determination unit, configured to determine to activate or deactivate uplink transmit diversity of a user equipment; and an indication sending unit, configured to send an activation request indication or a deactivation request indication to a radio network controller, so that the radio network controller instructs, according to the activation request indication, the user equipment to activate the uplink transmit diversity, or instructs, according to the deactivation request indication, the user equipment to deactivate the uplink transmit diversity.

In another aspect of the present invention, a transmission method for uplink transmit diversity is provided, which includes: receiving, by a radio network controller, an activation request indication sent by a base station when the base station determines to activate uplink transmit diversity of a user equipment or a deactivation request indication sent by a base station when the base station determines to deactivate uplink transmit diversity of a user equipment; and according to the activation request indication, instructing, by the radio network controller, the user equipment to activate the uplink transmit diversity, and notifying the base station that the uplink transmit diversity is activated, so that the user equipment activates the uplink transmit diversity according to the notification and the base station learns that the user equipment activates the uplink transmit diversity, or according to the deactivation request indication, instructing the user equipment to deactivate uplink transmit diversity, and notifying the base station that the uplink transmit diversity is deactivated, so that the user equipment deactivates the uplink transmit diversity according to the instruction and the base station learns that the user equipment deactivates the uplink transmit diversity according to the notification.

In another aspect of the present invention, a radio network controller is provided, which includes: an indication receiving unit, configured to receive an activation request indication or a deactivation request indication sent by a base station; and a notification sending unit, configured to, according to the activation request indication, instruct a user equipment to activate uplink transmit diversity and notify the base station that the uplink transmit diversity is activated, or according to the deactivation request indication, instruct a user equipment to deactivate the uplink transmit diversity and notify the base station that the uplink transmit diversity is deactivated.

In another aspect of the present invention, a transmission method for uplink transmit diversity is provided, which includes: receiving, by a user equipment, an activation notification for activating uplink transmit diversity or a deactivation notification for deactivating uplink transmit diversity sent by a radio network controller; and activating, by the user equipment, the uplink transmit diversity according to the activation notification, or, deactivating the uplink transmit diversity according to the deactivation notification;

where the activation notification sent by the radio network controller is sent according to an activation request indication received by the radio network controller, and the deactivation notification sent by the radio network controller is sent according to a deactivation request indication received by the radio network controller.

In another aspect of the present invention, a user equipment is provided, which includes: a notification receiving unit, configured to receive an activation notification for activating uplink transmit diversity or a deactivation notification for deactivating uplink transmit diversity sent by a radio network controller; and a processing unit, configured to activate the uplink transmit diversity according to the activation notification, or, deactivate the uplink transmit diversity according to the deactivation notification;

where the activation notification sent by the radio network controller is sent according to an activation request indication received by the radio network controller, and the deactivation notification sent by the radio network controller is sent according to a deactivation request indication received by the radio network controller.

In another aspect of the present invention, a transmission method for uplink transmit diversity is provided, which includes: receiving, by a drift radio network controller, an activation request indication or a deactivation request indication sent by a base station, and sending the received activation request indication or deactivation request indication to a serving radio network controller;

receiving, by the drift radio network controller, an activation notification sent by the serving radio network controller, where the activation notification is used for notifying the base station that a user equipment activates uplink transmit diversity, or, receiving a deactivation notification sent by the serving radio network controller, where the deactivation notification is used for notifying the base station that a user equipment deactivates uplink transmit diversity, where the activation notification sent by the serving radio network controller is sent according to the activation request indication received by the radio network controller, and the deactivation notification sent by the serving radio network controller is sent according to the deactivation request indication received by the radio network controller; and sending, by the drift radio network controller, the received activation notification or deactivation notification to the base station.

In another aspect of the present invention, a drift radio network controller is provided, which includes: a receiving unit, configured to receive an activation request indication or a deactivation request indication sent by a base station, and receive an activation notification for notifying the base station that a user equipment activates uplink transmit diversity or a deactivation notification for notifying the base station that a user equipment deactivates uplink transmit diversity sent by a serving radio network controller, where the activation notification sent by the serving radio network controller is sent according to the activation request indication received by the radio network controller, and the deactivation notification sent by the serving radio network controller is sent according to the deactivation request indication received by the radio network controller; and a sending unit, configured to send the received activation request indication or deactivation request indication to the serving radio network controller, and send the received activation notification or deactivation notification to the base station.

The transmission method, apparatus, and system for uplink transmit diversity provided in the embodiments of the present invention can adjust an uplink transmission manner suitable for a current transmission condition in time and effectively, thereby improving uplink transmission quality.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
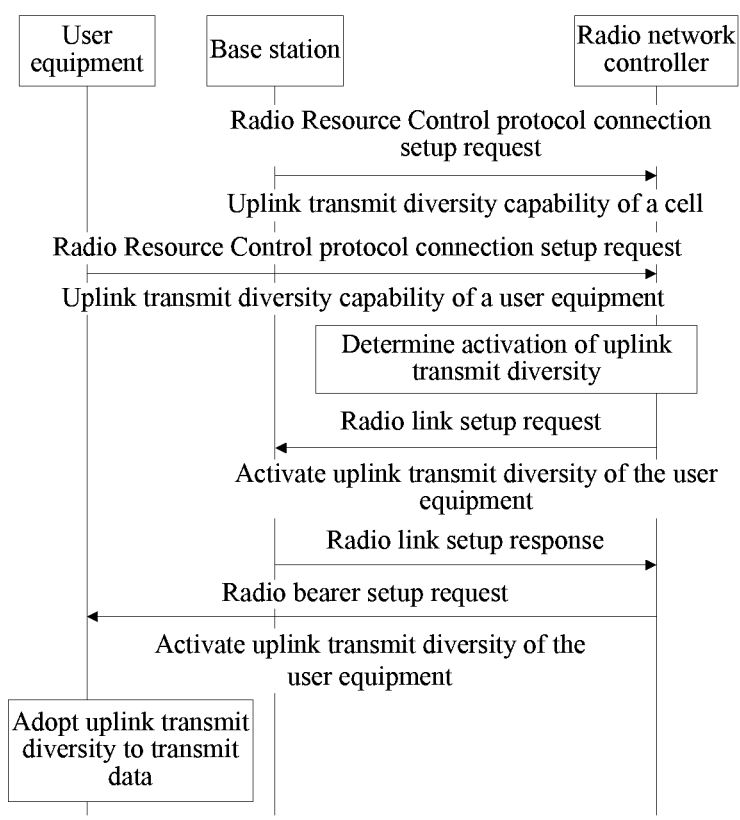
FIG. 1 is a schematic flow chart of a method for dynamically adjusting activation/deactivation of uplink transmit diversity of a UE provided in the prior art.
Figure 2:
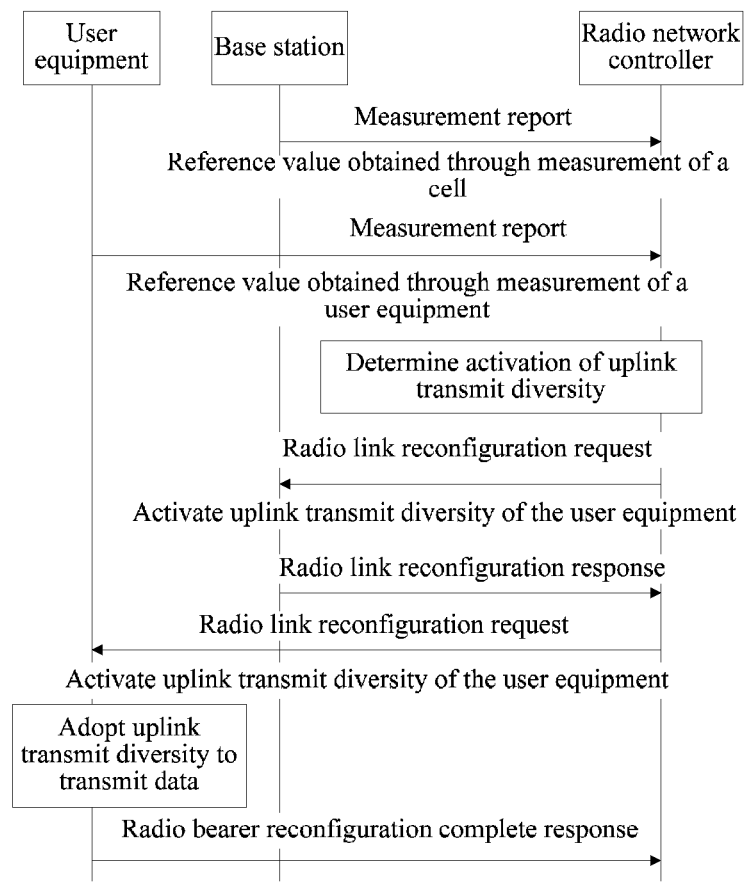
FIG. 2 is a schematic flow chart of another method for dynamically adjusting activation/deactivation of uplink transmit diversity of a UE provided in the prior art.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technologies described herein are applicable to various radio communications systems, for example, current 2G and 3 G communications systems and next generation communications systems, such as a Global System for Mobile communications (GSM, Global System for Mobile communications), a Code Division Multiple Access (CDMA, Code Division Multiple Access) system, a Time Division Multiple Access (TDMA, Time Division Multiple Access) system, Wideband Code Division Multiple Access (WCDMA, Wideband Code Division Multiple Access Wireless) system, a Frequency Division Multiple Access (FDMA) system, an orthogonal Frequency Division Multiple Access (OFDMA, Orthogonal Frequency-Division Multiple Access) system, a Single-Carrier FDMA (SC-FDMA) system, a General Packet Radio Service (GPRS, General Packet Radio Service) system, a Long Term Evolution (LTE, Long Term Evolution) system, and other communications systems of this sort.

Various aspects are described herein by combining a terminal and/or a base station and/or a base station controller.

A terminal may be a wireless terminal or may also be a wired terminal. A wireless terminal may refer to a device for providing a user with speech and/or data connectivity, a handheld device having a wireless connection function or other processing devices connected to a wireless modem. A wireless terminal can communicate with one or more core networks through a radio access network (for example, RAN, Radio Access Network). A wireless terminal may be a mobile terminal such as a mobile phone (or referred to as a "cellular" phone) and a computer having a mobile terminal, for example, a portable, a pocket, a handheld, a computer's built-in or a vehicle-mounted mobile device, which exchanges speech and/or data with a radio access network, and a device such as a personal communication service (PCS, Personal Communication Service) phone, a cordless phone, a Session Initiation Protocol (SIP) phone, a wireless local loop (WLL, Wireless Local Loop) station, and a personal digital assistant (PDA, Personal Digital Assistant). A wireless terminal may also be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device) or a user equipment (User Equipment).

A base station (for example, Access Point) may refer to a device that communicates with a wireless terminal through one or more sectors over an air interface in an access network. The base station can be configured to perform conversion between an air frame and an IP packet and serve as a router between a wireless terminal and rest parts in an access network, where the rest parts in the access network may include an Internet Protocol (IP) network. The base station can further coordinate attribute management on an air interface. For example, a base station may be a Base Transceiver Station (BTS, Base Transceiver Station) in GSM or CDMA, may also be a NodeB (NodeB) in WCDMA, and may further be an evolved NodeB (NodeB or eNB or e-NodeB, evolved NodeB) in LTE, which is not limited in the present invention.

A base station controller may be a base station controller (BSC, base station controller) in GSM or CDMA and may also be a radio network controller (RNC, Radio Network Controller) in WCDMA, which is not limited in the present invention.

In addition, the terms "system" and "network" herein are interchangeable. The term "and/or" herein only describes a correlation between correlated objects and may represent three relationships. For example, A and/or B may represent: only A exists, both A and B exist, and only B exists. In addition, the character "/" herein generally represents an "or" relationship between correlated objects.

To determine activation or deactivation of uplink transmit diversity in time and effectively to improve uplink transmission quality, an embodiment of the present invention provides a transmission method for uplink transmit diversity.

A base station sends an activation request indication to an RNC when determining to activate uplink transmit diversity of a user equipment UE according to a reference value obtained through measurement of the UE. According to the activation request indication, the RNC notifies the base station that the uplink transmit diversity is activated and instructs the UE to activate the uplink transmit diversity.

Alternatively, a base station sends a deactivation request indication to an RNC when determining to deactivate uplink transmit diversity of a UE according to a reference value obtained through measurement of the UE. According to the deactivation request indication, the RNC notifies the base station that the uplink transmit diversity is deactivated and instructs the UE to deactivate the uplink transmit diversity.

It should be noted that, in the embodiment of the present invention, an example in which a UE has two antennas is used as an example for illustration. When a UE activates uplink transmit diversity, that is, the UE is in an activated state for uplink transmit diversity, data channels are sent on both antennas of the UE. When the UE deactivates the uplink transmit diversity, that is, the UE is in a deactivated state for uplink transmit diversity, a data channel is sent on only one of two antennas of the UE, and the other antenna does not transmit data or only transmits a secondary pilot channel The present invention is described in detail by using specific embodiments.

Figure 3:
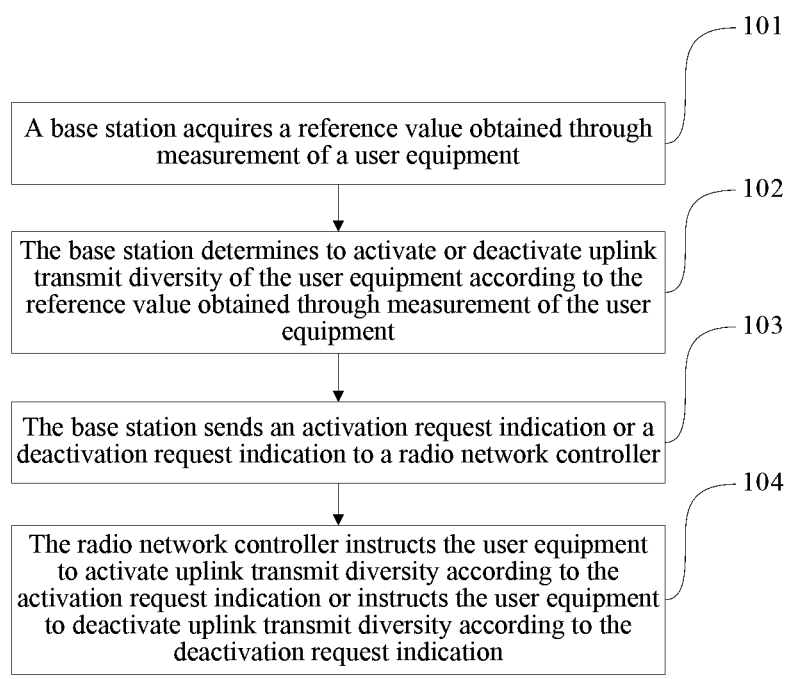
FIG. 3 is a schematic flow chart of a transmission method for uplink transmit diversity provided in an embodiment of the present invention.

As shown in FIG. 3, in this embodiment, activation/deactivation of uplink transmit diversity of a UE can be specifically implemented based on the following steps.

101. A base station acquires a reference value obtained through measurement of a UE.

In the embodiment of the present invention, a reference value obtained through measurement of the UE includes information such as power of a UE and a CQI (Channel Quality Indication, channel quality indication).

For example, a NodeB may receive a measurement report of a UE periodically reported by the UE, and acquires a reference value obtained through measurement of the UE from the measurement report.

102. The base station determines to activate or deactivate uplink transmit diversity of the UE according to the reference value obtained through measurement of the UE.

In the embodiment of the present invention, the uplink transmit diversity can adopt several diversity manners such as TSTD (time switched transmit diversity), OLTD (open loop transmit diversity), CLTD (closed loop transmit diversity), and MIMO (Multi-Input Multi-Output).

In addition, the transmission modes for uplink transmit diversity may be further classified into antenna switching (Ant Switching) and beamforming (Beamforming). The transmission principle of antenna switching is that a UE alternately measures transmit power of 2 transmit antennas and then selects the antenna with lower transmit power according to a TPC (Transmission Power Control, transmission power control) command word to transmit data. The transmission principle of beamforming is that a UE traverses a plurality of beamforming factors, predicts the maximum forming factor for a signal-to-noise ratio according to a power control command word, and uses the factor to weight data and transmit the weighted data.

For example, a NodeB can determine to activate or deactivate uplink transmit diversity of a UE according to a preset activation condition and a reference value obtained through measurement of the UE. Alternatively, the NodeB can also detect a reference value obtained through measurement of the NodeB, and determine to activate or deactivate the uplink transmit diversity of the UE according to the preset activation condition, the reference value obtained through measurement of the UE, and the reference value obtained through measurement of the NodeB. The reference value obtained through measurement of the NodeB includes information such as resource usage and receiver performance inside the NodeB. The activating uplink transmit diversity of the UE may be to configure and start the uplink transmit diversity of the UE, while the deactivating uplink transmit diversity of the UE may be to remove the configuration and stop the uplink transmit diversity of the UE.

103. The base station sends an activation request indication to an RNC when determining to activate the uplink transmit diversity of the UE or sends a deactivation request indication to an RNC when determining to deactivate the uplink transmit diversity of the UE.

For example, a NodeB can send to the RNC an activation request indication/deactivation request indication for uplink transmit diversity of the UE according to the determination result in step 102. That is, the NodeB sends to the RNC the activation request indication for activating the uplink transmit diversity of the UE when determining to activate the uplink transmit diversity of the UE, and the NodeB sends to the RNC the deactivation request indication for deactivating the uplink transmit diversity of the UE when determining to deactivate uplink transmit diversity of the UE.

104. The RNC instructs the UE to activate the uplink transmit diversity according to the activation request indication or instructs the UE to deactivate the uplink transmit diversity according to the deactivation request indication.

For example, the RNC can instruct the UE to activate/deactivate the uplink transmit diversity according to the activation request indication/deactivation request indication. Optionally, the RNC can further send a corresponding acknowledgement response to a NodeB when instructing the UE to activate/deactivate the uplink transmit diversity. Alternatively, the RNC can also send a corresponding activation/deactivation complete notification to the NodeB when learning that the UE has completed activation/deactivation of the uplink transmit diversity. For example, the RNC can instruct the UE to perform activation or deactivation processing of the uplink transmit diversity by using an L3 signaling message. The L3 signaling message is an RRC message of an air interface, for example, the RRC message may be Radio Bearer Reconfiguration. Alternatively, after having completed activation/deactivation of the uplink transmit diversity, the UE can further send a corresponding activation/deactivation complete notification to the NodeB directly through a physical channel.

In addition, before determining activation/deactivation of the uplink transmit diversity of the UE, the UE and the NodeB can separately send an uplink transmit diversity capability to the RNC, so that the RNC learns that the UE and the NodeB have the capability of adopting the uplink transmit diversity to transmit data. The RNC can separately send configuration parameter information to the UE and the NodeB after learning that the UE and the NodeB have the capability of adopting the uplink transmit diversity to transmit data, and the UE and the NodeB performs some configuration operations related to the uplink transmit diversity according to the configuration parameter information.

In the transmission method for uplink transmit diversity provided in this embodiment, a base station determines to activate/deactivate uplink transmit diversity of a UE according to a reference value obtained through measurement of the UE and instructs the RNC to instruct the UE to activate/deactivate the uplink transmit diversity. The base station can learn the reference value obtained through measurement of the UE in time and more effectively, so that determination of activation or deactivation of the uplink transmit diversity can be performed in time and more effectively, so as to adjust an uplink transmission manner suitable for a current transmission condition in time and effectively, thereby improving uplink transmission quality.

In the previous embodiment, after receiving an activation request indication/deactivation request indication sent by the base station according to a determination result, the RNC can send an acknowledgement response to the base station at the same time when instructing the UE to activate/deactivate the uplink transmit diversity, and can also send a complete notification to the base station when learning that the UE has completed activation/deactivation of the uplink transmit diversity. The following further describes the previous embodiment in detail by using an example in which an OLTD diversity manner is adopted for uplink transmit diversity and combining the foregoing different condition.

Figure 4:
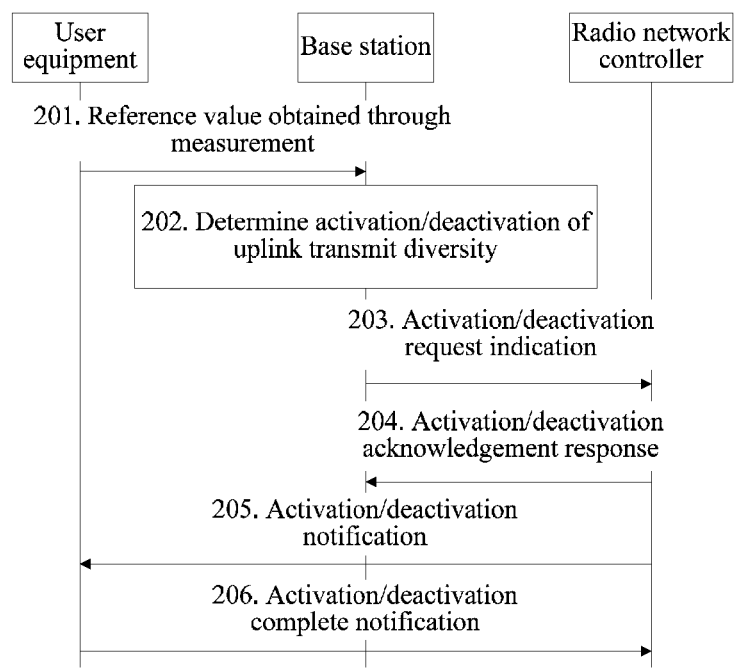
FIG. 4 is a schematic flow chart of another transmission method for uplink transmit diversity provided in an embodiment of the present invention.

As shown in FIG. 4, a transmission method for uplink transmit diversity in this embodiment includes:

201. A UE reports a reference value obtained through measurement of the UE to a NodeB through a physical channel 202. The NodeB determines whether to activate/deactivate uplink OLTD according to the reference value obtained through measurement reported by the UE and detected reference value obtained through measurement of the base station.

For example, the NodeB can determine to activate/deactivate the uplink OLTD of the UE according to power reported by the UE, a CQI, resource usage (or a related measurement quantity) inside the NodeB, and a preset activation/deactivation condition. The activation condition or deactivation condition can be flexibly set according to the transmission requirement of uplink data.

For example, it is assumed that the NodeB determines that the UE is currently in an out-of-sync state according to a received frame sent by the UE, and in this case TPC is incorrect, causing unreliable uplink transmit diversity performance. Therefore, if currently the UE is in an activated uplink OLTD state, the NodeB can determine to deactivate the uplink OLTD of the UE.

Alternatively, it is assumed that the NodeB determines that the UE is always in a power limited state according to a UPH (UE Power Headroom, transmit power headroom) reported by the UE. In this case, the power of a DPCCH (Dedicated Physical Control Channel, dedicated physical control channel) is also compressed, and a TPC command word fed back by the NodeB can no longer reflect true usage of the channel because in this case the TPC command word always increases a value of the power, which deteriorates uplink transmit diversity performance. Therefore, if currently the UE is in an activated uplink OLTD state, the NodeB can determine to deactivate the uplink OLTD of the UE.

Alternatively, it is assumed that the NodeB determines that the UE is in high speed movement according to an action of the UE, for example, that the UE performs a switching operation frequently within a short time, and in this case negative gain might occur in the case of adopting uplink transmit diversity. Therefore, if currently the UE is in an activated uplink OLTD state, the NodeB can determine to deactivate the uplink OLTD of the UE.

Alternatively, it is assumed that the NodeB determines that receiver performance deteriorates according to a detected reference value obtained through measurement of the NodeB, which affects uplink transmit diversity performance. Therefore, if currently the UE is in an activated uplink OLTD state, the NodeB can determine to deactivate the uplink OLTD of the UE.

Alternatively, it is assumed that the NodeB determines that a value of a CQI is lower than a configured threshold for a continuous time interval according to the CQI reported by the UE, so that it can be determined that the quality of the channel between the NodeB and the UE is relatively bad, which affects uplink transmit diversity performance. Therefore, if currently the UE is in an activated uplink OLTD state, the NodeB can determine to deactivate the uplink OLTD of the UE.

It is assumed that it is preset that the NodeB only determines to deactivate the uplink OLTD of the UE when a reference value obtained through measurement of the UE or a reference value obtained through measurement of the NodeB meet the foregoing conditions. When neither the reference value obtained through measurement of the UE nor the reference value obtained through measurement of the NodeB meets the foregoing conditions, the NodeB can determine to activate the uplink OLTD of the UE.

203. After determining to activate/deactivate the uplink OLTD, the NodeB sends an activation/deactivation request indication to an RNC.

For example, the NodeB can send an activation/deactivation request indication to the RNC through an Iub interface. For example, the NodeB can send an activation/deactivation request indication to the RNC through an Iub FP. Also, the NodeB can send an activation/deactivation request indication by using existing signaling, for example, add a certain number of bits in a DEDICATED MEASUREMENT REPORT (dedicated measurement report) sent to the RNC. These bits are configured to indicate activation/deactivation of uplink OLTD of a UE. For example, when determining to activate/deactivate uplink OLTD of a certain UE, the NodeB adds an identifier of the UE and one bit in a DEDICATED MEASUREMENT REPORT sent to the RNC and uses the bit as an indication bit. When the indication bit is 0, it indicates deactivation of the uplink OLTD of the UE. When the indication bit is 1, it indicates activation of the uplink OLTD of the UE. Alternatively, the NodeB can also send an activation request indication/deactivation request indication by using newly added signaling.

In addition, the NodeB can further send to an RNC a cause for activating/deactivating the uplink OLTD of the UE at the same time when sending to the RNC an activation/deactivation request indication. For example, it is assumed that the NodeB sends an activation/deactivation request indication by using a DEDICATED MEASUREMENT REPORT, meanwhile can add a certain number of bits in the DEDICATED MEASUREMENT REPORT, and preset different values for these bits to represent different causes for activation/deactivation. For example, when determining to deactivate the uplink OLTD of the UE because the UE is in a power limited state, the NodeB can add an identifier of the UE, an indication bit, and a cause representation bit in the DEDICATED MEASUREMENT REPORT. The indication bit is set to 0 to indicate deactivation of the uplink OLTD of the UE. The cause representation bit is set to 010 to represent that the cause for deactivation is that the UE is in a power limited state.

204. The RNC receives the activation/deactivation request indication sent by the NodeB and then return an acknowledgement response to the NodeB.

For example, after the RNC receives the activation/deactivation request indication sent by the NodeB, the RNC sends to the NodeB an acknowledgement response to activation/deactivation of the uplink OLTD of the UE. The NodeB performs corresponding adjustment according to the acknowledgement response to ensure synchronization between the NodeB and the UE. Refer to the prior art for the adjustment processing method for a NodeB, which is no longer elaborated here.

205. At the same time when returning the acknowledgement response to the NodeB, the RNC sends to the UE an uplink OLTD activation/deactivation notification according to the activation/deactivation request indication.

For example, at the same time when returning the acknowledgement response to the NodeB, the RNC can instruct the UE to activate/deactivate the uplink OLTD by using an RB reconfiguration request.

206. The RNC receives an uplink OLTD activation/deactivation complete notification sent by the UE.

For example, the UE learns by means of an RB reconfiguration request that the uplink OLTD of the UE needs to be activated/deactivated, and after having completed activation/deactivation of the uplink OLTD, the UE can send to the RNC an uplink OLTD activation/deactivation complete notification by using an RB reconfiguration response, that is, notifies the RNC that the UE has already completed the operation of activating/deactivating the uplink OLTD. After having completed activation of the uplink OLTD, the UE adopts the uplink OLTD to transmit uplink data.

In the transmission method for uplink transmit diversity provided in this embodiment, a base station determines to activate/deactivate uplink transmit diversity of a UE according to a reference value obtained through measurement of the UE and instructs the RNC to instruct the UE to activate/deactivate the uplink transmit diversity. The base station can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Figure 5:
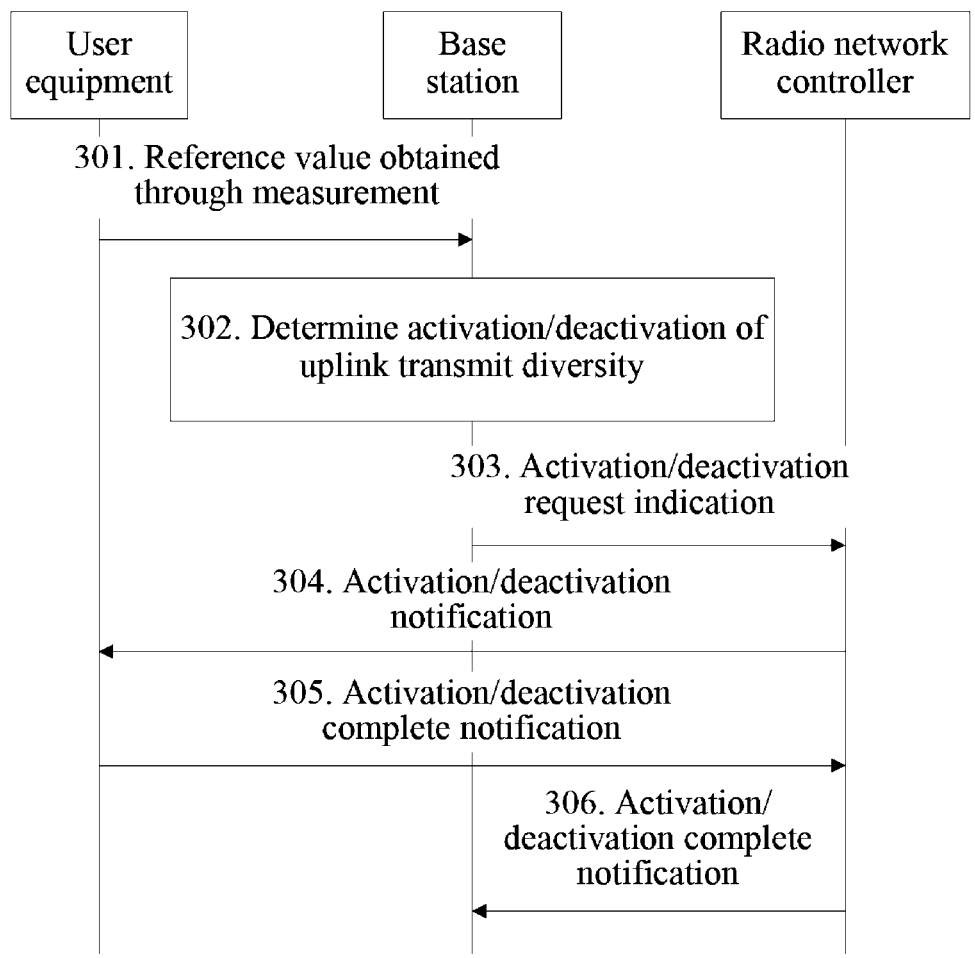
FIG. 5 is a schematic flow chart of another transmission method for uplink transmit diversity provided in an embodiment of the present invention.

As shown in FIG. 5, a transmission method for uplink transmit diversity in this embodiment includes:

301. A UE reports to a NodeB a reference value obtained through measurement of the UE through a physical channel

302. The NodeB determines whether to activate/deactivate uplink OLTD according to the reference value obtained through measurement reported by the UE and a detected reference value obtained through measurement of the NodeB.

Refer to step 202 for the specific operation of this step, which is no longer elaborated here.

303. After determining to activate/deactivate the uplink OLTD, the NodeB sends an activation/deactivation request indication to an RNC.

Refer to step 203 for the specific operation of this step, which is no longer elaborated here.

304. The RNC sends to the UE an uplink OLTD activation/deactivation notification according to the activation/deactivation request indication.

Refer to step 205 for the specific operation of this step, which is no longer elaborated here.

305. The RNC receives an uplink OLTD activation/deactivation complete notification sent by the UE.

Refer to step 206 for the specific operation of this step, which is no longer elaborated here.

306. The RNC receives the uplink OLTD activation/deactivation complete notification sent by the UE and then sends to the NodeB the activation/deactivation complete notification.

In the transmission method for uplink transmit diversity provided in this embodiment, a base station determines to activate/deactivate uplink transmit diversity of a UE according to a reference value obtained through measurement of the UE and instructs the RNC to instruct the UE to activate/deactivate the uplink transmit diversity. The base station can learn the reference value obtained through measurement of the UE in time and more effectively, so that determination of activation or deactivation of the uplink transmit diversity can be performed in time and more effectively, so as to adjust an uplink transmission manner suitable for a current transmission condition in time and effectively, thereby improving uplink transmission quality.

Corresponding to the foregoing embodiments, the embodiment of the present invention further provides a transmission method for uplink transmit diversity, which includes: receiving, by an RNC, an activation request indication sent by a base station when the base station determines to activate uplink transmit diversity of a UE according to a reference value obtained through measurement of the UE, and instructing the UE to activate the uplink transmit diversity according to the activation request indication; or, receiving, by an RNC, a deactivation request indication sent by a base station when the base station determines to deactivate uplink transmit diversity of a UE according to a reference value obtained through measurement of the UE, and instructing the UE to deactivate the uplink transmit diversity according to the deactivation request indication.

In the transmission method for uplink transmit diversity provided in this embodiment, a base station determines to activate/deactivate uplink transmit diversity of a UE according to a reference value obtained through measurement of the UE and instructs an RNC to instruct the UE to activate/deactivate the uplink transmit diversity. The base station can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

In addition, an embodiment of the present invention further provides a transmission method for uplink transmit diversity, which includes:

A UE sends to a base station a notification for activating uplink transmit diversity of the UE when determining to activate the uplink transmit diversity according to a reference value obtained through measurement of the UE.

Alternatively, the UE sends to the base station a notification for deactivating uplink transmit diversity of the UE when determining to deactivate the uplink transmit diversity according to a reference value obtained through measurement of the UE.

Figure 6:
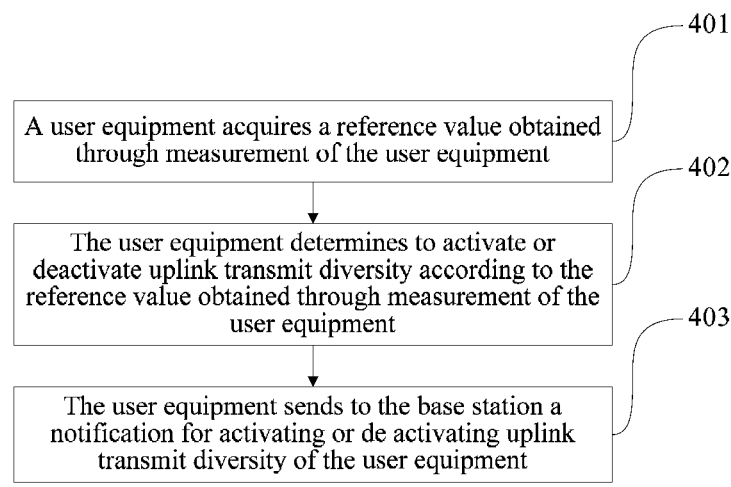
FIG. 6 is a schematic flow chart of another transmission method for uplink transmit diversity provided in an embodiment of the present invention.

As shown in FIG. 6, in this embodiment, activation/deactivation of uplink transmit diversity of a UE can be specifically implemented based on the following steps.

401. A UE acquires a reference value obtained through measurement of the UE.

For example, the UE can detect a reference value obtained through measurement of the UE.

402. The UE determines to activate or deactivate uplink transmit diversity of the UE according to the reference value obtained through measurement of the UE.

For example, the UE can determine to activate/deactivate uplink OLTD of the UE according to a reference value obtained through measurement such as detected power of the UE and channel quality and a preset activation/deactivation condition. Alternatively, the UE can also receive a reference value obtained through measurement of a NodeB, and determine to activate/deactivate the uplink OLTD of the UE according to detected power of the UE, channel quality, the received NodeB reference value obtained through measurement, and a preset activation/deactivation condition. The activation condition or deactivation condition can be flexibly set according to the transmission requirement of uplink data.

For example, it is assumed that the UE is in a CELL_DCH (CELL Dedicated Channel, cell dedicated channel) state. In this case, the UE has allocated one dedicated physical channel on the uplink and downlink, a UTRAN (Terrestrial Radio Access Network-UMTS, Terrestrial Radio Access Network) can learn the location of the UE at a cell level according to a current activation set of the UE, and the UE can use a dedicated transmission channel, a downlink HS-DSCH (High Speed Downlink Shared Channel, high speed downlink shared channel), and a combination of these transmission channels. In this state, if currently the UE is in a deactivated uplink OLTD state, the UE can determine to activate the uplink OLTD. In addition, when the UE is in a CELL FACH (CELL Forward Access Channel, cell forward access channel) state, the UE can also activate the uplink OLTD.

It is assumed that the NodeB has activated CPC (Continuous Packet Connectivity, continuous packet connectivity) and the CPC adopts a manner of reserving a minimum bandwidth, so as to avoid a re-establishment delay caused by complete release of dedicated channels without any service activity of a user and reduce control channel overhead, thereby increasing the number of users. In this state, if currently the UE is in a deactivated uplink OLTD state, the UE can determine to activate the uplink OLTD.

Optionally, it is assumed that the UE receives an RLC ACK (Radio Link Control ACKnowledge Character, radio link control acknowledge) to a reconfiguration response message. The UE determines that the NodeB uplink is synchronized according to the RLC ACK, so that when the UE is in a CELL_DCH state and the NodeB has activated the CPC, if currently the UE is in a deactivated uplink OLTD state, the UE can determine to activate the uplink OLTD.

Optionally, it is assumed that the UE detects that the UE is currently not in a high speed movement state, when the UE is in a CELL_DCH state and the NodeB has activated the CPC, if currently the UE is in a deactivated uplink OLTD state, the UE can determine to activate the uplink OLTD.

Optionally, it is assumed that currently the power of the UE is not limited. In this case, the power of both DPCCH and the E-DPCCH are not to be compressed, and uplink transmit diversity performance is not affected. Therefore, when the UE is in a CELL_DCH state and the NodeB has activated the CPC, if currently the UE is in a deactivated uplink OLTD state, the UE can determine to activate the uplink OLTD.

Optionally, it is assumed that the UE determines that channel quality of a serving cell exceeds a configured threshold for a continuous time interval and accordingly determines that the current channel quality of the serving cell is good. The continuous time interval (time interval) and the threshold (threshold) can be configured by the RNC, or can also be set by the UE. When the UE is in a CELL_DCH state and the NodeB has activated the CPC, if currently the UE is in a deactivated uplink OLTD state, the UE can determine to activate the uplink OLTD.

403. The UE sends to the base station a notification for activating uplink transmit diversity of the UE when determining to activate the uplink transmit diversity or sends to the base station a notification for deactivating uplink transmit diversity of the UE when determining to deactivate the uplink transmit diversity.

For example, the UE sends to the NodeB a notification for activating uplink transmit diversity of the UE when determining to activate the uplink transmit diversity of the UE, and the NodeB performs corresponding adjustment according to the notification and receives data subsequently transmitted by the UE by adopting an uplink transmit diversity manner. Alternatively, the UE sends to the NodeB a notification for deactivating uplink transmit diversity of the UE when determining to deactivate the uplink transmit diversity of the UE, and the NodeB performs corresponding adjustment according to the notification and receives data transmitted by the UE subsequently by adopting a non-uplink transmit diversity manner In the transmission method for uplink transmit diversity provided in this embodiment, a UE activates/deactivates uplink transmit diversity of the UE according to a reference value obtained through measurement of the UE. The UE can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Corresponding to the previous embodiment, the embodiment of the present invention further provides a transmission method for uplink transmit diversity, which includes: receiving, by a base station, a notification for activating uplink transmit diversity of a UE sent by UE when the UE determines to activate uplink transmit diversity according to a reference value obtained through measurement of the UE; or, receiving, by a base station, a notification for deactivating uplink transmit diversity of a UE sent by the UE when the UE determines to deactivate uplink transmit diversity according to a reference value obtained through measurement of the UE.

In the transmission method for uplink transmit diversity provided in this embodiment, a UE activates/deactivates uplink transmit diversity of the UE according to a reference value obtained through measurement of the UE. The UE can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

In an embodiment of the present invention, the transmission method for uplink transmit diversity includes:

sending, by a NodeB, an activation request indication to an RNC, so that the RNC instructs a UE to activate uplink transmit diversity according to the activation request indication; receiving, by the RNC, the activation request indication sent by the NodeB, and according to the activation request indication, instructing the UE to activate uplink transmit diversity and notifying the NodeB that uplink transmit diversity is activated; and receiving, by the UE, an activation notification for activating the uplink transmit diversity from the RNC, and activating the uplink transmit diversity according to the activation notification; or sending, by a NodeB, a deactivation request indication to an RNC, so that the RNC instructs a UE to deactivate uplink transmit diversity according to the deactivation request indication; receiving, by the RNC, the deactivation request indication sent by the NodeB, and according to the deactivation request indication, instructing the UE to deactivate the uplink transmit diversity and notifying the NodeB that the uplink transmit diversity is deactivated; and receiving, by the UE, a deactivation notification for deactivating the uplink transmit diversity from the RNC, and deactivating the uplink transmit diversity according to the deactivation notification.

Optionally, the NodeB sends to the RNC an activation request indication when determining that the uplink transmit diversity of the UE needs to be activated or sends a deactivation request indication to the RNC when determining that the uplink transmit diversity of the UE needs to be deactivated.

Optionally, the NodeB can determine whether to activate the uplink transmit diversity of the UE according to a reference value obtained through measurement of the UE.

For example, the NodeB can determine to activate or deactivate the uplink transmit diversity of the UE according to a preset activation condition and a reference value obtained through measurement of the UE as in the previous embodiments. Alternatively, the NodeB can also detect a reference value obtained through measurement of the NodeB and determine to activate or deactivate the uplink transmit diversity of the UE according to a preset activation condition, a reference value obtained through measurement of the UE, and the reference value obtained through measurement of the NodeB. The reference value obtained through measurement of the NodeB includes information such as resource usage and receiver performance inside the NodeB.

For example, the NodeB can send an activation/deactivation request indication to the RNC through an Iub interface. For example, the NodeB can send an activation/deactivation request indication to the RNC through an Iub FP. Also, the NodeB can send an activation/deactivation request indication by using existing signaling, for example, add a certain number of bits in a DEDICATED MEASUREMENT REPORT (dedicated measurement report) sent to the RNC. These bits are configured to indicate activation/deactivation of uplink OLTD of a UE. For example, when determining to activate/deactivate uplink OLTD of a certain UE, the NodeB adds an identifier of the UE and one bit in a DEDICATED MEASUREMENT REPORT sent to the RNC and uses the bit as an indication bit. When the indication bit is 0, it indicates deactivation of the uplink OLTD of the UE. When the indication bit is 1, it indicates activation of the uplink OLTD of the UE. Alternatively, the NodeB can also send an activation request indication/deactivation request indication by using newly added signaling.

Optionally, in this embodiment, the deactivation request indication sent by the NodeB to the RNC can carry at least one of antenna information and secondary pilot information recommended by the NodeB for the RNC. The antenna information is configured to indicate an antenna that is recommended by the NodeB and transmits a data channel after the UE deactivates the uplink transmit diversityNodeB. Specifically, the antenna information is located at one field in the deactivation indication, and the field shows the serial number of an antenna that transmits a data channel after the UE deactivates the uplink transmit diversity or the serial number of an antenna that does not transmit a data channel after the UE deactivates the uplink transmit diversity. It is assumed that two antennas of the UE are antenna 1 and antenna 2, after the antenna information indicates whether to use antenna 1 or antenna 2 to transmit a data channel after the UE deactivates the transmit diversity. A field corresponding to antenna information in a deactivation indication can record the serial number 1 or 2 to indicate that the antenna that transmits a data channel after the UE deactivates uplink transmit diversity is antenna 1 or antenna 2 or that the antenna that does not transmit a data channel after the UE deactivates uplink transmit diversity is antenna 1 or antenna 2.

The NodeB can determine which antenna of the UE has better channel quality according to the measurement of the secondary pilot channel. Therefore, the NodeB can recommend to the RNC, by using antenna information in the deactivation request indication, which antenna the UE adopts or does not adopt to transmit a data channel after deactivation.

The secondary pilot information is configured to indicate a sending period of a secondary pilot signal recommended by the NodeB after the UE deactivates the uplink transmit diversityNodeB. The NodeB can recommend to the RNC, in the deactivation request indication, a sending period of a secondary pilot signal after the UE deactivates the uplink transmit diversity.

It can be understood that regardless of whether the NodeB has recommended antenna information and secondary pilot information in the deactivation request indication, after receiving the deactivation request indication, the RNC can determine antenna information and/or secondary pilot information for the UE. Of course, if the NodeB has made a recommendation, the RNC can determine antenna information and/or secondary pilot information according to the recommendation of the NodeB, and carry the antenna information and/or secondary pilot information in the deactivation notification sent to the UE and the NodeB.

It should be noted that after receiving an activation/deactivation indication of the NodeB, the RNC can instruct the UE to activate/deactivate the uplink transmit diversity by using L3 signaling as described in the previous embodiments. When instructing the UE to activate/deactivate the uplink transmit diversity, the RNC sends to the NodeB a corresponding acknowledgement response to notify the NodeB that the uplink transmit diversity is activated/deactivated, or, after learning that the UE has completed activation/deactivation of the uplink transmit diversity, the RNC sends a corresponding activation/deactivation complete notification to the NodeB to notify the NodeB that the uplink transmit diversity is activated/deactivated. Of course, it can be understood that the RNC can use multiple different messages to instruct the UE to activate/deactivate uplink transmit diversity and notify the NodeB that the uplink transmit diversity is activated/deactivated.

Figure 11:
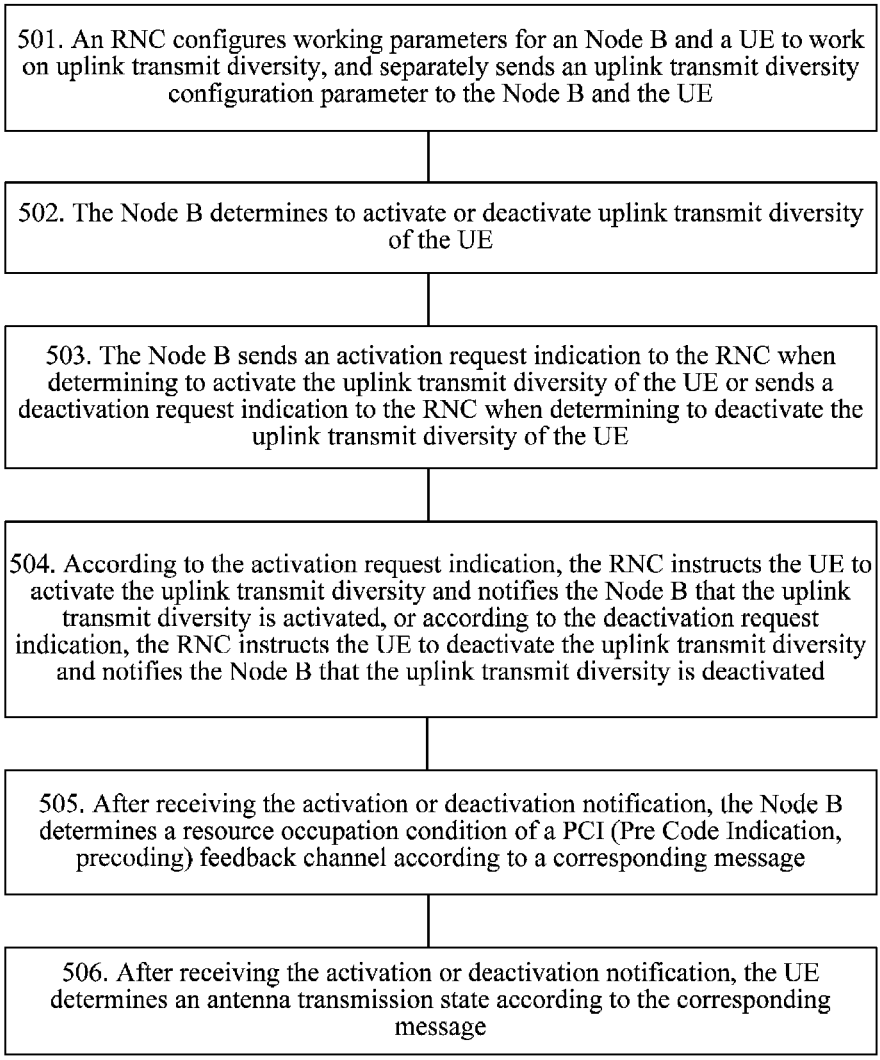
FIG. 11 is a schematic flow chart of another transmission method for uplink transmit diversity provided in an embodiment of the present invention.

As shown in FIG. 11, this embodiment can specifically implement activation or deactivation of uplink transmit diversity of a UE based on the following steps and includes:

501. An RNC configures working parameters for a NodeB and a UE to work on uplink transmit diversity, and separately sends an uplink transmit diversity configuration parameter to the NodeB and the UE.

The uplink transmit diversity configuration parameter at least includes a precoding feedback channel. The NodeB and the UE receive the uplink transmit diversity configuration parameter and perform an uplink transmit diversity operation according to the configuration parameter.

502. The NodeB determines to activate or deactivate the uplink transmit diversity of the UE.

In the embodiment of the present invention, the uplink transmit diversity can adopt diversity manners such as TSTD (Time Switched Transmission Diversity, time switched transmit diversity), OLTD (Open Loop Transmission Diversity, open loop transmit diversity), CLTD (Closed Loop Transmission Diversity, closed loop transmit diversity), and MIMO (Multi-Input Multi-Output, Multi-Input Multi-Output).

In addition, the transmission manner for uplink transmit diversity may further be classified into antenna switching (Ant Switching) and beamforming (Beamforming). The transmission principle of antenna switching is that a UE alternately measures transmit power of 2 transmit antennas and then selects the antenna with lower transmit power according to a TPC (Transmission Power Control, transmission power control) command word to transmit data. The transmission principle of beamforming is that a UE traverses a plurality of beamforming factors, predicts the maximum forming factor for a signal-to-noise ratio according to a power control command word, and uses the factor to weight and transmit data.

The activation of the uplink transmit diversity of the UE may be to configure and start the uplink transmit diversity of the UE, and specifically, it refers to that both antennas of the UE has a data channel transmission state. The deactivation of the uplink transmit diversity of the UE may be to remove the configuration and stop the uplink transmit diversity of the UE, and specifically, it can be considered as that a data channel is sent on only one of the two antennas of the UE, and on the other antenna, no signal is sent or only a control channel is sent. A deactivated state can further be classified into a sub-state where a data channel is sent on antenna 1 or s sub-state where a data channel is sent on antenna 2.

503. The NodeB sends an activation request indication to the RNC when determining to activate the uplink transmit diversity of the UE or sends a deactivation request indication to the RNC when determining to deactivate the uplink transmit diversity of the UE.

For example, the NodeB can send to the RNC an activation request indication or deactivation request indication for uplink transmit diversity of the UE according to the determination result in step 102. That is, when determining to activate the uplink transmit diversity of the UE, the NodeB sends to the RNC an activation request indication for activating the uplink transmit diversity of the UE, or when determining to deactivate the uplink transmit diversity of the UE, the NodeB sends to the RNC a deactivation request indication for deactivating the uplink transmit diversity of the UE.

Optionally, when sending the deactivation indication to the RNC, the NodeB can recommend to the RNC which antenna the UE adopts or does not adopt to transmit a data channel and/or a sending period of a secondary pilot signal after deactivation. Specifically, the base station can add in the deactivation request indication at least one of antenna information and secondary pilot information recommended by the base station for the RNC. The antenna information is configured to indicate an antenna that is recommended by the NodeB and transmits a data channel after the user equipment deactivates the uplink transmit diversityNodeB. The secondary pilot information is configured to indicate a sending period of a secondary pilot signal recommended by the NodeB after the user equipment deactivates the uplink transmit diversityNodeB.

For example, the NodeB can determine which antenna has better channel quality according to the measurement of the secondary pilot channel, so as to recommend to the RNC which antenna the UE adopts or does not adopt to transmit the data channel after deactivation.

504. According to the activation request indication, the RNC instructs the UE to activate the uplink transmit diversity and notifies the NodeB that the uplink transmit diversity is activated, or according to the deactivation request indication, the RNC instructs the UE to deactivate the uplink transmit diversity and notifies the NodeB that the uplink transmit diversity is deactivated.

For example, the RNC can instruct the UE to activate/deactivate the uplink transmit diversity by using L3 signaling. An L3 signaling message is an RRC message of an air interface, and for example, may be Radio Bearer Reconfiguration. The RNC can send to the NodeB a corresponding acknowledgement response to notify the NodeB that the uplink transmit diversity is activated/deactivated when instructing the UE to activate/deactivate the uplink transmit diversity, or send to the NodeB a corresponding activation/deactivation complete notification to notify the NodeB that the uplink transmit diversity is activated/deactivated when learning that the UE has completed activating/deactivating the uplink transmit diversity. Of course, it can be understood that, the RNC can use multiple different messages, for example, user-defined signaling, to instruct the UE to activate/deactivate the uplink transmit diversity and notify the NodeB of that the uplink transmit diversity is activated/deactivated.

For example, if the NodeB adds, in the deactivation indication, antenna information of the recommended antenna that transmits a data channel, in the deactivation notification, the RNC can instruct the UE to perform deactivation and specify information about an antenna to use to transmit a data channel after deactivation according to the recommendation. For example, it is assumed that the UE includes antenna 1 and antenna 2. The antenna information can at least include two antenna choices, for example, to transmit a data channel on antenna 1 or to transmit a data channel on antenna 2. Of course, if the NodeB does not add, in the deactivation indication, antenna information of the recommend antenna that transmits a data channel, the RNC also can perform determination, and in the deactivation notification, instruct the UE to perform deactivation and specify information about an antenna to use to transmit a data channel after deactivation.

Optionally, in the deactivation notification, the RNC can notify the NodeB and the UE of a sending period of a secondary pilot signal in a deactivated state, so that the NodeB monitors the secondary pilot frequency, and determines whether to activate the uplink transmit diversity according to the monitoring result. Specifically, the base station determines a time point of detecting the secondary pilot signal of the UE according to the secondary pilot information carried in the deactivation notification message. The base station detects secondary pilot quality of the user equipment according to the determined time point, so as to determine whether to send an activation request indication to the RNC to activate the uplink transmit diversity of the UE.

In addition, before determining activation/deactivation of the uplink transmit diversity of the UE, the UE and the NodeB can separately send to an RNC an uplink transmit diversity capability, that is, whether the uplink transmit diversity is supported or not supported, so that the RNC learns that the UE and the NodeB have the capability of adopting the uplink transmit diversity to transmit data. The RNC can separately send to the UE and the NodeB uplink diversity configuration parameter information after learning that the UE and the NodeB have the capability of adopting the uplink transmit diversity to transmit data, and the UE and the NodeB perform some configuration operations related to the uplink transmit diversity according to the configuration parameter information.

505. After receiving the activation or deactivation notification, the NodeB determines a resource usage of a PCI (Pre Code Indication, precoding) feedback channel according to a corresponding message.

After receiving the activation/deactivation notification, the NodeB performs an operation of activating or deactivating the uplink transmit diversity of the UE according to a corresponding indication.

Optionally, when receiving a deactivation notification, the NodeB should release a corresponding precoding feedback channel resource for the UE. Alternatively, after receiving a deactivation notification and when the RNC allocates the precoding feedback channel resource to another UE for use, the NodeB should release the corresponding precoding feedback channel resource for the UE. Specifically, after receiving the deactivation notification, the NodeB receives a radio link management message sent by the RNC, and when the radio link management message instructs the RNC to allocate the precoding feedback channel corresponding to the UE to another UE thereof, the NodeB releases the corresponding precoding feedback channel of the UE. After receiving a activation notification, if the corresponding activation notification message carries a precoding feedback channel resource, the NodeB uses this newly allocated resource, and otherwise, uses the resource before deactivation, that is, during last activation. Specifically, if the activation notification message carries a precoding feedback channel, the NodeB determines the precoding feedback channel in the activation notification message as a precoding feedback channel after the UE activates the uplink transmit diversity, and uses this newly allocated resource. If the activation notification message does not carry the precoding feedback channel of the UE, the NodeB determines the precoding channel configured during last activation as a precoding feedback channel after the UE activates the uplink transmit diversity, that is, uses the resource before deactivation.

Optionally, if the received deactivation notification carries a related parameter for sending a secondary pilot frequency, the NodeB performs secondary pilot frequency detection and activation determination according to a time point of sending a secondary pilot frequency specified in the parameter. Specifically, the NodeB determines a time point of detecting a secondary pilot signal of the UE according to the secondary pilot information carried in the deactivation notification message. The NodeB detects secondary pilot quality of the UE according to the determined time point to determine whether to send an activation request indication to the radio network controller to activate the uplink transmit diversity of the UE.

506. After receiving the activation or deactivation notification, the UE determines an antenna transmission state according to a corresponding message.

The deactivation notification can be sent to the UE through a CLTD deletion operation or reconfiguration to a corresponding single antenna state. If the deactivation notification specifies which antenna to use to transmit a data channel, the UE determines the antenna used to transmit a data channel after deactivation according to the specified information.

Optionally, if the received deactivation notification carries a related parameter for sending a secondary pilot frequency, the UE sends a secondary pilot frequency according to a time point of sending a secondary pilot frequency specified in the parameter.

In the transmission method for uplink transmit diversity provided in this embodiment, a NodeB determines to activate/deactivate uplink transmit diversity of a UE according to a reference value obtained through measurement of the UE and instructs an RNC to instruct the UE to activate/deactivate the uplink transmit diversity. Also, an antenna to use to transmit a data channel and/or a sending period of a secondary pilot signal after deactivation can be recommended to the UE. The NodeB can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality. Also, the NodeB can release a code resource of a corresponding precoding feedback (PCI) channel after the uplink transmit diversity is deactivated, thereby increasing the efficiency in using a code resource.

Figure 12:
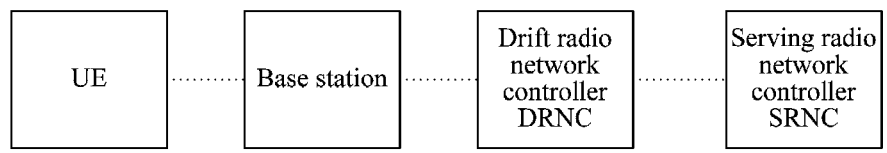
FIG. 12 is a schematic view of an application network scenario for another transmission method for uplink transmit diversity provided in an embodiment of the present invention.

It should be noted that, in the foregoing embodiments, the network scenarios where the transmission methods for uplink transmit diversity provided by the present invention are applied are all described by using a NodeB, an RNC, and a UE as three ends. However, the present invention is not limited thereto. FIG. 12 is another network scenario where a transmission method for uplink transmit diversity of the present invention is applied. The network includes a NodeB, a drift radio network controller DRNC, a serving radio network controller SRNC, and a UE. The work of the NodeB, the SRNC, and the UE is the same as that in the foregoing embodiments. The difference is that data transmission between the NodeB and the SRNC needs to be transferred through the DRNC. Therefore, on the basis of such a network scenario where a DRNC is included, another transmission method for uplink transmit diversity provided in an embodiment of the present invention includes:

receiving, by a DRNC, an activation request indication sent by a NodeB, for example, receiving an activation request indication sent by a NodeB when the NodeB determines to activate uplink transmit diversity of a UE according to factors such as related reference measurement or receiver performance, and sending the activation request indication to an SRNC; and receiving, by the DRNC, an activation notification for notifying the NodeB that the UE activates the uplink transmit diversity sent by the SRNC, and sending the activation notification to the NodeB; where the activation notification sent by the SRNC is sent according to an activation request indication received by the DRNC;

or, receiving, by a DRNC, a deactivation request indication sent by a NodeB, for example, receiving a deactivation request indication sent by a NodeB when the NodeB determines to deactivate uplink transmit diversity of a UE according to factors such as related reference measurement or receiver performance, and sending the deactivation request indication to an SRNC; and receiving, by the DRNC, a deactivation notification for notifying the NodeB that the UE deactivates the uplink transmit diversity sent by the SRNC, and sending the deactivation notification to the NodeB; where the deactivation notification sent by the SRNC is sent according to a deactivation request indication received by the DRNC.

Optionally, the deactivation request indication carries at least one of antenna information and secondary pilot information recommended by the NodeB for the radio network controllerNodeB. The antenna information is configured to indicate an antenna that transmits a data channel after the UE deactivates the uplink transmit diversity recommended by the NodeB. The secondary pilot information is configured to indicate a sending period of a secondary pilot signal after the UE deactivates the uplink transmit diversity recommended by the NodeB. Specifically, the antenna information is the serial number of an antenna that transmits a data channel after the UE deactivates the uplink transmit diversity or the serial number of an antenna that does not transmit a data channel after the UE deactivates the uplink transmit diversity.

Optionally, the deactivation notification carries at least one of antenna information and secondary pilot information. The antenna information is configured to indicate an antenna that is specified by the SRNC and transmits a data channel after the UE deactivates the uplink transmit diversity. The secondary pilot information is configured to indicate a sending period of a secondary pilot signal specified by the SRNC after the UE deactivates the uplink transmit diversity. Specifically, the antenna information is the serial number of an antenna that transmits a data channel after the UE deactivates the uplink transmit diversity or the serial number of an antenna that does not transmit a data channel after the UE deactivates the uplink transmit diversity.

Optionally, after receiving the deactivation notification for notifying the NodeB that the UE deactivates the uplink transmit diversity sent by the SRNC, the DRNC releases a precoding feedback channel resource corresponding to the UE.

Furthermore, the DRNC receives a radio link management message sent by the SRNC. When the radio link management message instructs the SRNC to allocate to another UE a precoding feedback channel corresponding to the UE, the DRNC releases a precoding feedback channel resource corresponding to the UE, and send the radio link management message to the NodeB.

Figure 7:
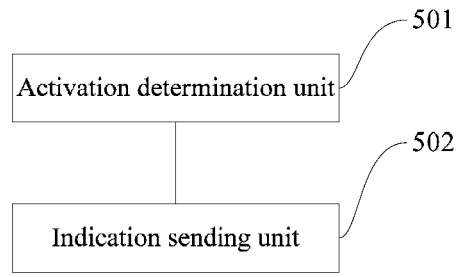
FIG. 7 is a schematic structural diagram of a base station provided in an embodiment of the present invention.

Corresponding to the foregoing method, an embodiment of the present invention further provides a base station. As shown in FIG. 7, the base station includes:

An activation determination unit 501, configured to determine to activate or deactivate uplink transmit diversity of a UE. Optionally, the activation determination unit 501 determines to activate or deactivate uplink transmit diversity of a UE according to a reference value obtained through measurement of the UE.

An indication sending unit 502, configured to send an activation request indication to an RNC when the activation determination unit 501 determines to activate the uplink transmit diversity of the UE, so that the RNC instructs the UE to activate the uplink transmit diversity according to the activation request indication; or send a deactivation request indication to an RNC when the activation determination unit 501 determines to deactivate the uplink transmit diversity of the UE, so that the RNC instructs the UE to deactivate the uplink transmit diversity according to the deactivation request indication.

Optionally, the deactivation request indication sent by the indication sending unit 502 carries at least one of antenna information and secondary pilot information recommended by the base station for the radio network controller.

The antenna information is configured to indicate an antenna that transmits a data channel after the user equipment deactivates the uplink transmit diversity recommended by the base station. The secondary pilot information is configured to indicate a sending period of a secondary pilot signal after the user equipment deactivates the uplink transmit diversity recommended by the base station.

Figure 13:
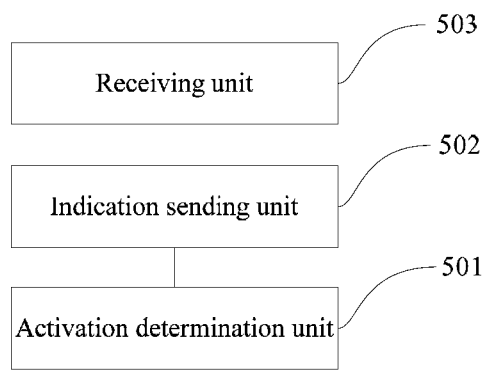
FIG. 13 is a schematic structural diagram of a base station provided in an embodiment of the present invention.

In an embodiment of the present invention, as shown in FIG. 13, the base station further includes a receiving unit 503, configured to receive, after the indication sending unit 502 sends the deactivation request indication to the radio network controller, a deactivation notification message sent by the radio network controller, where the deactivation notification message is configured to notify the base station that the user equipment deactivates the uplink transmit diversity.

Optionally, the deactivation notification message carries at least one of antenna information and secondary pilot information. The antenna information is configured to indicate an antenna that is specified by the radio network controller and transmits a data channel after the user equipment deactivates the uplink transmit diversity. The secondary pilot information is configured to indicate a sending period of a secondary pilot signal specified by the radio network controller after the user equipment deactivates the uplink transmit diversity.

Figure 14:
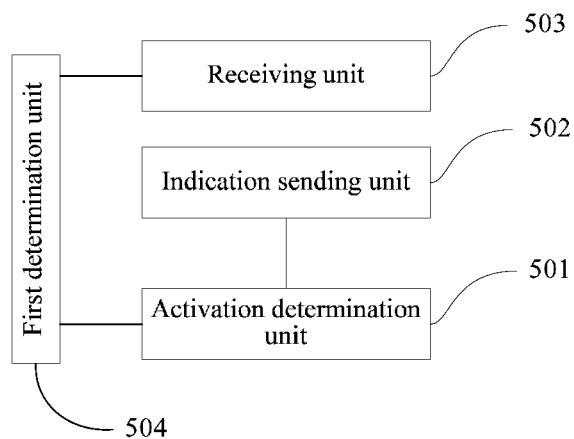
FIG. 14 is a schematic structural diagram of a base station provided in an embodiment of the present invention.

Furthermore, in a specific embodiment, as shown in FIG. 14, the deactivation notification message received by the receiving unit 503 carries the secondary pilot information.

In this case, the base station further includes:

A first determination unit 504, configured to determine a time point of detecting a secondary pilot signal of the user equipment according to the secondary pilot information carried in the deactivation notification message.

The activation determination unit 501, further configured to detect secondary pilot quality of the user equipment according to the determined time point, so as to determine whether to send an activation request indication to the radio network controller to activate the uplink transmit diversity of the user equipment.

Figure 15:
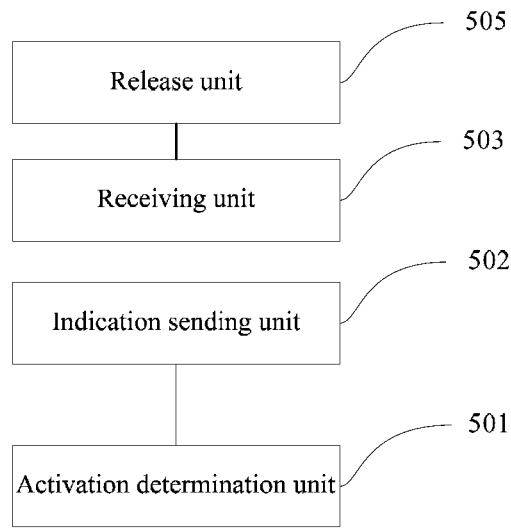
FIG. 15 is a schematic structural diagram of a base station provided in an embodiment of the present invention.

Optionally, in another embodiment of the present invention, as shown in FIG. 15, the base station further includes:

A release unit 505, configured to release a precoding feedback channel corresponding to the user equipment after the receiving unit 503 receives a deactivation notification message sent by the radio network controller.

Furthermore, in a specific embodiment, the receiving unit 503 is further configured to receive a radio link management message sent by the radio network controller. In this case, the release unit 505 is specifically configured to: when the radio link management message instructs the radio network controller to allocate the precoding feedback channel corresponding to the user equipment to another user equipment, release the precoding feedback channel corresponding to the user equipment.

Figure 16:
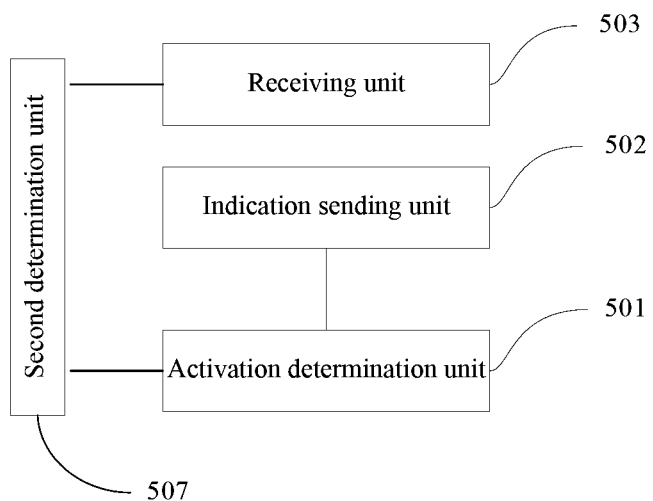
FIG. 16 is a schematic structural diagram of a base station provided in an embodiment of the present invention.

In another embodiment of the present invention, as shown in FIG. 16:

The receiving unit 503 is further configured to receive an activation notification message sent by the radio network controller, where the activation notification message is configured to notify the base station that the user equipment activates uplink transmit diversity.

The base station further includes: a second determination unit 507, configured to determine, if the activation notification message carries a precoding feedback channel, the precoding feedback channel in the activation notification message as a precoding channel after the user equipment activates the uplink transmit diversity; or determine, if the activation notification message does not carry a precoding feedback channel of the user equipment, a precoding feedback channel used before the user equipment deactivates the uplink transmit diversity as a precoding feedback channel after the user equipment activates the uplink transmit diversity.

In another embodiment of the present invention, the base station specifically further includes: a reference value receiving unit, configured to receive a reference value obtained through measurement of a UE sent by the UE, where the reference value obtained through measurement of the UE includes power of the UE and channel quality.

In another embodiment of the present invention, the base station specifically further includes: a reference value detection unit, configured to detect reference value obtained through measurement of a base station and determine to activate or deactivate uplink transmit diversity of a UE, where the reference value obtained through measurement of the base station includes internal resource usage of the base station.

The activation determination unit 501 is specifically configured to determine to activate or deactivate the uplink transmit diversity of the UE according to the reference value obtained through measurement received by the reference value receiving unit and the reference value obtained through measurement detected by the reference value detection unit.

In another embodiment of the present invention, the activation determination unit 501 is specifically configured to determine to, when determining that the UE is out of synchronization according to the reference value obtained through measurement received by the reference value receiving unit and the reference value obtained through measurement detected by the reference value detection unit, deactivate the uplink transmit diversity of the UE.

In another embodiment of the present invention, the activation determination unit 501 is specifically configured to determine to, when determining that the power of the UE is limited according to the reference value obtained through measurement received by the reference value receiving unit and the reference value obtained through measurement detected by the reference value detection unit, deactivate the uplink transmit diversity of the UE.

In another embodiment of the present invention, the activation determination unit 501 is specifically configured to determine to deactivate the uplink transmit diversity of the UE when determining that receiver performance of the base station is lower than a specified threshold according to the reference value obtained through measurement received by the reference value receiving unit and the reference value obtained through measurement detected by the reference value detection unit; or determine to deactivate the uplink transmit diversity of the UE when determining that channel quality is lower than a specified threshold according to the reference value obtained through measurement received by the reference value receiving unit and the reference value obtained through measurement detected by the reference value detection unit.

In another embodiment of the present invention, the base station further includes: a response receiving unit, configured to receive an activation acknowledgement response sent by the RNC when instructing the UE to activate the uplink transmit diversity; or, receive a deactivation acknowledgement response sent by the RNC when instructing the UE to deactivate the uplink transmit diversity.

In another embodiment of the present invention, the base station further includes: a notification receiving unit, configured to receive, when the UE activates the uplink transmit diversity and sends to the RNC an uplink transmit diversity activation complete notification by using an air interface message, an activation complete notification sent by the RNC; or receive, when the UE deactivates the uplink transmit diversity and sends to the RNC an uplink transmit diversity deactivation complete notification by using an air interface message, a deactivation complete notification sent by the RNC.

In another embodiment of the present invention, the base station further includes: a receiving notification unit, configured to receive an uplink transmit diversity activation complete notification sent by the UE; or receive an uplink transmit diversity deactivation complete notification sent by the UE.

For the specific working method of the base station described in the embodiment of the present invention, refer to the methods described in FIG. 3-FIG. 5, which is no longer elaborated here.

A base station provided in this embodiment determines to activate/deactivate uplink transmit diversity of a UE according to a reference value obtained through measurement of the UE and instructs an RNC to instruct the UE to activate/deactivate the uplink transmit diversity. The base station can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Figure 8:
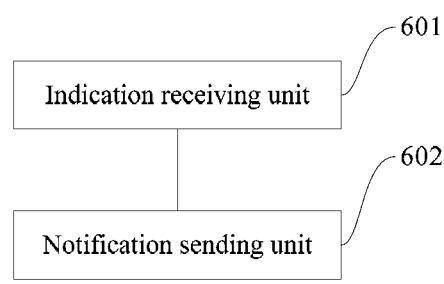
FIG. 8 is a schematic structural diagram of a radio network controller provided in an embodiment of the present invention.

Corresponding to the foregoing base station, an embodiment of the present invention further provides an RNC, which, as shown in FIG. 8, includes: an indication receiving unit 601 and a notification sending unit 602.

The indication receiving unit 601 is configured to receive an activation request indication for activating uplink transmit diversity of a UE sent by a base station, or, receive a deactivation request indication for deactivating uplink transmit diversity of a UE sent by a base station. Optionally, the indication receiving unit 601 is specifically configured to receive the activation request indication sent by the base station when the base station determines to activate the uplink transmit diversity of the UE, or, configured to receive the deactivation request indication sent by the base station when the base station determines to deactivate the uplink transmit diversity of the UE. Optionally, the base station determines to activate or deactivate the uplink transmit diversity of the UE according to a reference value obtained through measurement of the UE.

The notification sending unit 602 is configured to send to the UE and the base station a notification for activating the uplink transmit diversity of the UE according to the activation request indication, or, send to the UE and the base station a notification for deactivating the uplink transmit diversity of the UE according to the deactivation request indication.

In another embodiment of the present invention, the deactivation request indication received by the indication receiving unit 601 carries at least one of antenna information and secondary pilot information recommended by the base station for the radio network controller. The antenna information is configured to indicate an antenna that is recommended by the base station and transmits a data channel after the user equipment deactivates the uplink transmit diversity. The secondary pilot information is configured to indicate a sending period of a secondary pilot signal recommended by the base station after the user equipment deactivates the uplink transmit diversity. Optionally, the antenna information is the serial number of an antenna that transmits a data channel after the user equipment deactivates the uplink transmit diversity or the serial number of an antenna that does not transmit a data channel after the user equipment deactivates the uplink transmit diversity.

In another embodiment of the present invention, the notification sending unit 602 is specifically configured to separately send a deactivation notification message to the base station and the user equipment, where the deactivation notification message is configured to instruct the user equipment to deactivate the uplink transmit diversity and notify the base station that the uplink transmit diversity is deactivated. The deactivation notification message separately sent to the base station and the user equipment carries at least one of antenna information and secondary pilot information. The antenna information is configured to indicate an antenna that is specified by the radio network controller and transmits a data channel after the user equipment deactivates the uplink transmit diversity. The secondary pilot information is configured to indicate a sending period of a secondary pilot signal specified by the radio network controller after the user equipment deactivates the uplink transmit diversity. Optionally, the antenna information is the serial number of an antenna that transmits a data channel after the user equipment deactivates the uplink transmit diversity or the serial number of an antenna that does not transmit a data channel after the user equipment deactivates the uplink transmit diversity.

In another embodiment of the present invention, the notification sending unit 602 is further configured to send a radio link management message to the base station. The radio link management message instructs the radio network controller to allocate a precoding feedback channel corresponding to the user equipment to another user equipment, so that the base station releases the precoding feedback channel corresponding to the user equipment.

In another embodiment of the present invention, the notification sending unit 602 is specifically configured to separately send an activation notification message to the base station and the user equipment. The activation notification message is configured to instruct the user equipment to activate the uplink transmit diversity of the user equipment and notify the base station that the uplink transmit diversity of the user equipment is activated. The activation notification message carries a precoding feedback channel of the user equipment or does not carry a precoding feedback channel of the user equipment.

In another embodiment of the present invention, the indication receiving unit 601 is specifically configured to receive an activation request indication sent by the base station when the base station determines to activate the uplink transmit diversity of the UE according to the reference value obtained through measurement of the UE and the reference value obtained through measurement of the base station; or, receive a deactivation request indication sent by the base station when the base station determines to deactivate the uplink transmit diversity of the UE according to the reference value obtained through measurement of the UE and the reference value obtained through measurement of the base station.

In another embodiment of the present invention, the RNC further includes: a response sending unit, configured to send, when sending the notification for activating the uplink transmit diversity to the UE, an activation acknowledgement response to the base station; or send, when sending the notification for deactivating the uplink transmit diversity to the UE, a deactivation acknowledgement response to the base station.

In another embodiment of the present invention, the RNC further includes: a complete notification receiving unit and a complete notification sending unit.

The complete notification receiving unit is configured to receive an uplink transmit diversity activation complete notification sent by the UE by using an air interface message after activating the uplink transmit diversity, or an uplink transmit diversity deactivation complete notification.

The complete notification sending unit is configured to send an activation complete notification to the base station after receiving the uplink transmit diversity activation complete notification sent by the UE; or, send a deactivation complete notification to the base station after receiving the uplink transmit diversity deactivation complete notification sent by the UE.

The RNC provided in this embodiment receives an activation request indication/deactivation request indication for activating/deactivating uplink transmit diversity of a UE sent by a base station according to a reference value obtained through measurement of the UE, and instructs the UE to activate/deactivate uplink transmit diversity according to the activation request indication/deactivation request indication. The base station can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Figure 9:
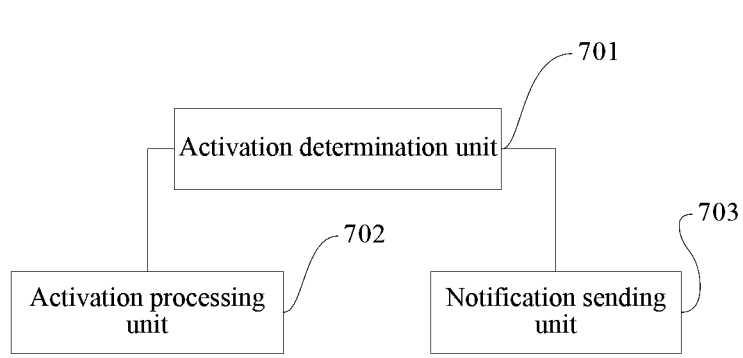
FIG. 9 is a schematic structural diagram of a user equipment provided in an embodiment of the present invention.

Corresponding to the foregoing method, an embodiment of the present invention further provides a UE, which, as shown in FIG. 9, includes: an activation determination unit 701, an activation processing unit 702, and a notification sending unit 703.

The activation determination unit 701 is configured to determine to activate or deactivate uplink transmit diversity according to a reference value obtained through measurement of the UE.

The activation processing unit 702 is configured to activate the uplink transmit diversity when the activation determination unit 701 determines to activate the uplink transmit diversity, and deactivate the uplink transmit diversity when the activation determination unit 702 determines to deactivate the uplink transmit diversity of the UE.

The notification sending unit 703 is configured to send to a base station a notification for activating the uplink transmit diversity of the UE when the activation determination unit 701 determines to activate the uplink transmit diversity, or, send to a base station a notification for deactivating the uplink transmit diversity of the UE when the activation determination unit 701 determines to deactivate the uplink transmit diversity.

In another embodiment of the present invention, the UE further includes: a reference value detection unit, configured to detect the reference value obtained through measurement of the UE, where the reference value obtained through measurement of the UE includes power of the UE and channel quality.

In another embodiment of the present invention, the UE further includes: a reference value receiving unit, configured to receive a reference value obtained through measurement of the base station sent by the base station, where the reference value obtained through measurement of the base station includes internal resource usage of the base station.

The activation determination unit 701 is configured to determine to activate or deactivate the uplink transmit diversity according to the reference value obtained through measurement received by the reference value receiving unit and the reference value obtained through measurement detected by the reference value detection unit.

In another embodiment of the present invention, the activation determination unit 701 is specifically configured to determine to activate the uplink transmit diversity when determining that a UE is in a CELL_DCH state according to the reference value obtained through measurement received by the reference value receiving unit and the reference value obtained through measurement detected by the reference value detection unit.

In another embodiment of the present invention, the activation determination unit 701 is specifically configured to determine to activate the uplink transmit diversity of the UE when determining that the base station has activated continuous packet connectivity according to the reference value obtained through measurement received by the reference value receiving unit and the reference value obtained through measurement detected by the reference value detection unit.

For the specific working method of the UE described in the embodiment of the present invention, refer to the method described in FIG. 6, which is no longer elaborated here.

The UE provided in this embodiment activates/deactivates uplink transmit diversity of the UE according to a reference value obtained through measurement of the UE. The UE can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Corresponding to the foregoing UE, an embodiment of the present invention further provides a base station, which includes: a notification receiving unit, configured to receive a notification for activating uplink transmit diversity of a UE sent by the UE when the UE determines to activate the uplink transmit diversity according to a reference value obtained through measurement of the UE; or, receive a notification for deactivating uplink transmit diversity of a UE sent by the UE when the UE determines to deactivate the uplink transmit diversity according to a reference value obtained through measurement of the UE.

In another embodiment of the present invention, the notification receiving unit is specifically configured to receive a notification for activating the uplink transmit diversity of the UE sent by the UE when the UE determines to activate the uplink transmit diversity according to the reference value obtained through measurement of the UE and the reference value obtained through measurement of the base station; or, receive a notification for deactivating the uplink transmit diversity of the UE sent by the UE when the UE determines to deactivate the uplink transmit diversity according to the reference value obtained through measurement of the UE and the reference value obtained through measurement of the base station.

The base station provided in this embodiment receives an activation/deactivation complete notification sent by the UE after the UE activates/deactivates the uplink transmit diversity of the UE according to the reference value obtained through measurement of the UE. The UE can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Figure 10:
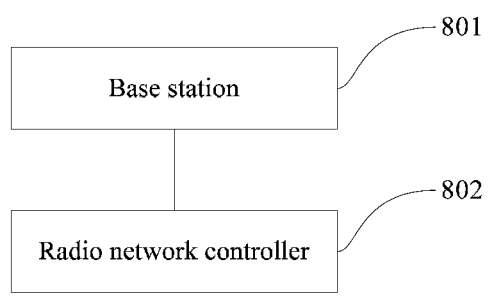
FIG. 10 is a schematic structural diagram of a transmission system for uplink transmit diversity provided in an embodiment of the present invention.

Corresponding to the foregoing method, an embodiment of the present invention further provides a transmission system for uplink transmit diversity, which, as shown in FIG. 10, includes a base station 801 and an RNC 802.

The base station 801 is configured to send an activation request indication to the RNC 802 when determining to activate uplink transmit diversity of a UE according to a reference value obtained through measurement of the UE; or, send a deactivation request indication to the RNC 802 when determining to deactivate uplink transmit diversity of a UE according to a reference value obtained through measurement of the UE.

The RNC 802 is configured to receive the activation request indication sent by the base station 801, and instruct the UE to activate the uplink transmit diversity according to the activation request indication; or, receive the deactivation request indication sent by the base station 801, and instruct the UE to deactivate the uplink transmit diversity according to the deactivation request indication.

In the transmission system for uplink transmit diversity provided in this embodiment, a base station determines to activate/deactivate uplink transmit diversity of a UE according to a reference value obtained through measurement of the UE and instructs an RNC to instruct the UE to activate/deactivate uplink transmit diversity. The base station can learn the reference value obtained through measurement of the UE in time and more effectively, so that determination of activation or deactivation of uplink transmit diversity can be performed in time and more effectively, so as to adjust an uplink transmission manner suitable for a current transmission condition in time and effectively, thereby improving uplink transmission quality.

Figure 17:
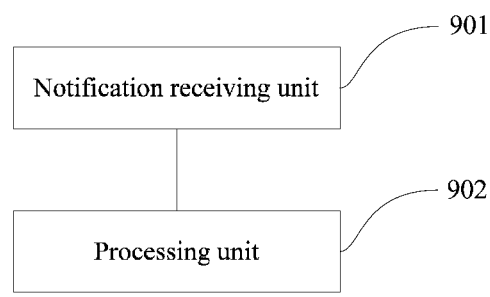
FIG. 17 is a schematic structural diagram of a user equipment provided in an embodiment of the present invention.

Correspondingly, an embodiment of the present invention further provides a UE, which, as shown in FIG. 17, includes:

A notification receiving unit 901, configured to receive an activation notification for activating uplink transmit diversity or a deactivation notification for deactivating uplink transmit diversity sent by a radio network controller.

A processing unit 902, configured to activate the uplink transmit diversity according to the activation notification, or deactivate the uplink transmit diversity according to the deactivation notification.

The activation notification sent by the radio network controller is sent according to an activation request indication received by the radio network controller, and the deactivation notification sent by the radio network controller is sent according to a deactivation request indication received by the radio network controller.

In the embodiment of the present invention, the notification receiving unit 901 is specifically configured to: receive a deactivation notification message for instructing the user equipment to deactivate the uplink transmit diversity sent by the radio network controller to the user equipment, where the deactivation notification message carries at least one of antenna information and secondary pilot information. The antenna information is configured to indicate an antenna that is specified by the radio network controller and transmits a data channel after the user equipment deactivates the uplink transmit diversity, so that after the user equipment deactivates the uplink transmit diversity, the antenna indicated in the antenna information is used to transmit a data channel. The secondary pilot information is configured to indicate a sending period of a secondary pilot signal specified by the radio network controller after the user equipment deactivates the uplink transmit diversity, so that after the user equipment deactivates the uplink transmit diversity, a secondary pilot signal is sent according to the sending period of a secondary pilot signal indicated in the secondary pilot information. Optionally, the antenna information is the serial number of an antenna that transmits a data channel after the user equipment deactivates the uplink transmit diversity or the serial number of an antenna that does not transmit a data channel after the user equipment deactivates the uplink transmit diversity.

In the embodiment of the present invention, the notification receiving unit 901 is specifically configured to receive an activation notification message for instructing the user equipment to activate the uplink transmit diversity sent by the radio network controller.

The processing unit 902 is specifically configured to: if the activation notification message carries a precoding feedback channel, determine the precoding feedback channel in the activation notification message as a precoding channel after the user equipment activates the uplink transmit diversity; or, if the activation notification message does not carry a precoding feedback channel of the user equipment, determine a precoding channel in an uplink transmit diversity configuration parameter as a precoding channel after the user equipment activates the uplink transmit diversity, where the precoding channel in the uplink transmit diversity configuration parameter can be a precoding feedback channel used before the user equipment deactivates the uplink transmit diversity.

Figure 18:
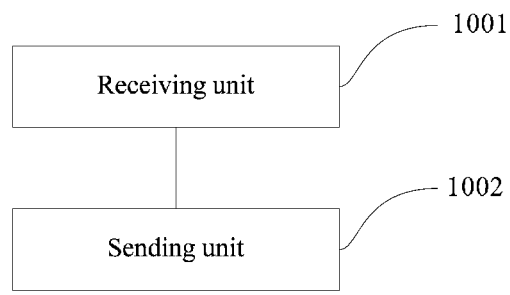
FIG. 18 is a schematic structural diagram of a drift radio network controller provided in an embodiment of the present invention.

Correspondingly, an embodiment of the present invention further provides a drift radio network controller, which, as shown in FIG. 18, includes:

A receiving unit 1001, configured to receive an activation request indication or a deactivation request indication sent by a base station, and receive an activation notification for notifying the base station that a user equipment activates uplink transmit diversity or a deactivation notification for notifying the base station that a user equipment deactivates uplink transmit diversity sent by a serving radio network controller; where the activation notification sent by the serving radio network controller is sent according to an activation request indication received by the serving radio network controller, and the deactivation notification sent by the serving radio network controller is sent according to a deactivation request indication received by the serving radio network controller.

A sending unit 1002, configured to send the received activation request indication or deactivation request indication to the serving radio network controller, and send the received activation notification or deactivation notification to the base station.

Optionally, in the embodiment of the present invention, the deactivation request indication carries at least one of antenna information and secondary pilot information recommended by the base station for the radio network controller. The antenna information is configured to indicate an antenna that is recommended by the base station and transmits a data channel after the user equipment deactivates the uplink transmit diversity. The secondary pilot information is configured to indicate a sending period of a secondary pilot signal recommended by the base station after the user equipment deactivates the uplink transmit diversity. Optionally, the antenna information is the serial number of an antenna that transmits a data channel after the user equipment deactivates the uplink transmit diversity or the serial number of an antenna that does not transmit a data channel after the user equipment deactivates the uplink transmit diversity.

Optionally, in the embodiment of the present invention, the deactivation notification carries at least one of antenna information and secondary pilot information. The antenna information is configured to indicate an antenna that is specified by the serving radio network controller and transmits a data channel after the user equipment deactivates the uplink transmit diversity. The secondary pilot information is configured to indicate a sending period of a secondary pilot signal specified by the serving radio network controller after the user equipment deactivates the uplink transmit diversity. Optionally, the antenna information is the serial number of an antenna that transmits a data channel after the user equipment deactivates the uplink transmit diversity or the serial number of an antenna that does not transmit a data channel after the user equipment deactivates the uplink transmit diversity.

Figure 19:
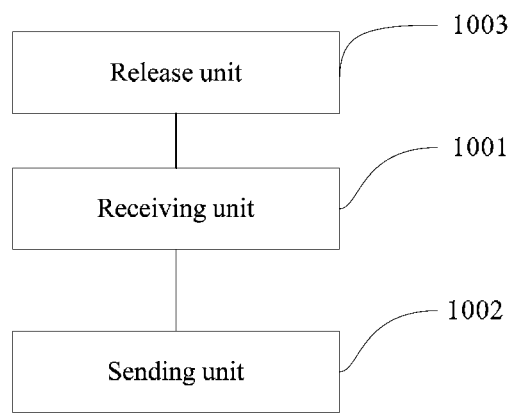
FIG. 19 is a schematic structural diagram of a drift radio network controller provided in an embodiment of the present invention.

In the embodiment of the present invention, as shown in FIG. 19, the drift radio network controller may further include a release unit 1003, configured to release, after the receiving unit receives the deactivation notification sent by the serving radio network controller, a precoding feedback channel corresponding to the user equipment.

Specifically, the receiving unit 1001 can be further configured to receive a radio link management message sent by the serving radio network controller, where the radio link management message instructs the radio network controller to allocate a precoding feedback channel corresponding to the user equipment to another user equipment. The sending unit 1002 is further configured to send the radio link management message to the base station. In this case, the release unit 1003 specifically can be further configured to release the precoding feedback channel corresponding to the user equipment after the receiving unit 1001 receives the radio link management message.

It may be clearly understood by persons skilled in the art that, for the purpose of convenient and brief description, a detailed working process of the foregoing system, apparatus, and unit may refer to the corresponding process in the foregoing method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A transmission method for uplink transmit diversity, comprising:
   determining, by a base station, to deactivate uplink transmit diversity of a user equipment, and
   sending, by the base station, a deactivation request indication to a radio network controller, wherein the deactivation request indication is used for the radio network controller to instruct the user equipment to deactivate the uplink transmit diversity according to the deactivation request indication.

2. The method according to claim 1, further comprising:
   determining, by the base station, to deactivate the uplink transmit diversity of the user equipment according to a reference value obtained through measurement of the user equipment.

3. The method according to claim 1, wherein,
   the deactivation request indication carries at least one of antenna information and secondary pilot information recommended by the base station for the radio network controller; and
   the antenna information is configured to indicate an antenna that is recommended by the base station and transmits a data channel after the user equipment deactivates the uplink transmit diversity, and the secondary pilot information is configured to indicate a sending period of a secondary pilot signal recommended by the base station after the user equipment deactivates the uplink transmit diversity.

4. The method according to claim 1, wherein after the sending, by the base station, the deactivation request indication to the radio network controller, the method further comprises:
   receiving, by the base station, a notification sent by the radio network controller, wherein the notification is configured to notify the base station that the user equipment deactivates the uplink transmit diversity.

5. The method according to claim 4, wherein the notification carries at least one of antenna information and secondary pilot information; and
the antenna information is configured to indicate an antenna that is specified by the radio network controller and transmits a data channel after the user equipment deactivates the uplink transmit diversity, and the secondary pilot information is configured to indicate a sending period of a secondary pilot signal specified by the radio network controller after the user equipment deactivates the uplink transmit diversity.

6. The method according to claim 4, wherein the method further comprises:
releasing, by the base station, a precoding feedback channel resource corresponding to the user equipment, wherein the precoding feedback channel resource is used for the base station to receive a usage weight on at least two antennas of the user equipment from the user equipment when the uplink transmit diversity is activated.

7. A transmission method for uplink transmit diversity, comprising:
receiving, by a radio network controller, a deactivation request indication sent by a base station when the base station determines to deactivate uplink transmit diversity of a user equipment; and
instructing, by the radio network controller, the user equipment to deactivate the uplink transmit diversity according to the deactivation request indication, wherein the instruction is used for the user equipment to deactivate the uplink transmit diversity according to the instruction.

8. The method according to claim 7, wherein,
the deactivation request indication carries at least one of antenna information and secondary pilot information recommended by the base station for the radio network controller; and
the antenna information is configured to indicate an antenna that transmits a data channel after the user equipment deactivates the uplink transmit diversity recommended by the base station, and the secondary pilot information is configured to indicate a sending period of a secondary pilot signal after the user equipment deactivates the uplink transmit diversity recommended by the base station.

9. The method according to claim 7, wherein the method further comprises:
notifying, by the radio network controller, the base station that the uplink transmit diversity is deactivated according to the deactivation request indication.

10. The method according to claim 9, wherein the notification is used for the base station to learn that the user equipment deactivates uplink transmit diversity and the base station needs to release a precoding feedback channel resource corresponding to the user equipment, wherein the precoding feedback channel resource is used for the base station to receive a usage weight on at least two antennas of the user equipment from the user equipment when the uplink transmit diversity is activated.

11. A base station, comprising:
a processor, configured to determine whether to activate or deactivate uplink transmit diversity of a user equipment; and
a sender, configured to send an activation request indication or a deactivation request indication to a radio network controller, wherein the activation request indication is used for the radio network controller to instruct the user equipment to activate the uplink transmit diversity according to the activation request indication, and the deactivation request indication is used for the radio network controller to instruct the user equipment to deactivate the uplink transmit diversity according to the deactivation request indication.

12. The base station according to claim 11, wherein,
the processor is specifically configured to determine to activate or deactivate the uplink transmit diversity of the user equipment according to a reference value obtained through measurement of the user equipment.

13. The base station according to claim 11, wherein the deactivation request indication sent by the processor carries at least one of antenna information and secondary pilot information recommended by the base station for the radio network controller; and
the antenna information is configured to indicate an antenna that is recommended by the base station and transmits a data channel after the user equipment deactivates the uplink transmit diversity, and the secondary pilot information is configured to indicate a sending period of a secondary pilot signal recommended by the base station after the user equipment deactivates the uplink transmit diversity.

14. The base station according to claim 11, further comprising:
a receiver, configured to receive a notification sent by the radio network controller after the sender sends the deactivation request indication to the radio network controller, wherein the notification is configured to notify the base station that the user equipment deactivates the uplink transmit diversity.

15. The base station according to claim 14, further comprising:
a release unit, configured to release a precoding feedback channel resource corresponding to the user equipment after the receiver receives the notification, wherein the precoding feedback channel resource is used for the base station to receive a usage weight on at least two antennas of the user equipment from the user equipment when the uplink transmit diversity is activated.

16. The base station according to claim 14, wherein,
the notification further carries at least one of antenna information and secondary pilot information; the antenna information is configured to indicate an antenna that is specified by the radio network controller and transmits a data channel after the user equipment deactivates the uplink transmit diversity; and the secondary pilot information is configured to indicate a sending period of a secondary pilot signal specified by the radio network controller after the user equipment deactivates the uplink transmit diversity.

17. A radio network controller, comprising:
a receiver, configured to receive an activation request indication or a deactivation request indication sent by a base station; and
a sender, configured to instruct, according to the activation request indication, a user equipment to activate uplink transmit diversity, wherein the instruction is used for the user equipment to activate the uplink transmit diversity according to the instruction, or instruct, according to the deactivation request indication, the user equipment to deactivate the uplink transmit diversity, wherein the instruction is used for the user equipment to deactivate the uplink transmit diversity according to the instruction.

18. The radio network controller according to claim 17, wherein the sender is further configured to notify the base station that the uplink transmit diversity is activated according to the activation request indication, or the uplink transmit diversity is deactivated according to the deactivation request indication.

19. The radio network controller according to claim 18, wherein the notification sent according to the deactivation request indication is further used for the base station to learn that the base station needs to release a precoding feedback channel resource corresponding to the user equipment, wherein the precoding feedback channel resource is used for the base station to receive a usage weight on at least two antennas of the user equipment from the user equipment when the uplink transmit diversity is activated.

20. The radio network controller according to claim 17, wherein,
- the received deactivation request indication carries at least one of antenna information and secondary pilot information recommended by the base station for the radio network controller; and
- the antenna information is configured to indicate an antenna that is recommended by the base station and transmits a data channel after the user equipment deactivates the uplink transmit diversity, and the secondary pilot information is configured to indicate a sending period of a secondary pilot signal recommended by the base station after the user equipment deactivates the uplink transmit diversity.

* * * * *